United States Patent [19]

Yasuda et al.

[11] Patent Number: 4,987,851
[45] Date of Patent: Jan. 29, 1991

[54] APPARATUS FOR FORMING ORGANIC THIN FILM

[75] Inventors: Satoshi Yasuda, Kawasaki; Shigeru Wakayama, Yokohama; Yoshiaki Tsukumo, Tokyo; Takashi Haraguchi, Fujisawa; Syun Egusa, Yokohama, all of Japan

[73] Assignee: Kabushiki Kaisha Toshiba, Kawasaki, Japan

[21] Appl. No.: 292,314

[22] Filed: Dec. 30, 1988

[30] Foreign Application Priority Data

Jan. 12, 1988 [JP] Japan .................................. 63-3237
Dec. 5, 1988 [JP] Japan .............................. 63-306039

[51] Int. Cl.5 ......................... B05C 13/00; B05C 3/02
[52] U.S. Cl. .................................... 118/403; 118/402; 118/422; 118/423; 118/425; 118/426; 118/503
[58] Field of Search ............... 118/402, 403, 422, 423, 118/424, 425, 426, 427, 428, 500, 503

[56] References Cited

U.S. PATENT DOCUMENTS

| | | | |
|---|---|---|---|
| 1,832,514 | 11/1931 | Thorne | 118/402 |
| 4,511,604 | 4/1985 | Barraud et al. | 118/402 |
| 4,645,693 | 2/1987 | Roberts et al. | 118/402 |
| 4,674,436 | 6/1987 | Miyazaki et al. | 118/402 |
| 4,738,824 | 4/1988 | Takeuchi | 118/425 |
| 4,801,476 | 1/1989 | Dunsmuir et al. | 118/402 |
| 4,848,270 | 1/1989 | Wakayama et al. | 118/402 |

FOREIGN PATENT DOCUMENTS

| | | | |
|---|---|---|---|
| 1291058 | 12/1986 | Japan | 118/402 |
| 1291058 | 12/1986 | Japan | 118/402 |

*Primary Examiner*—James C. Housel
*Attorney, Agent, or Firm*—Oblon, Spivak, McClelland, Maier & Neustadt

[57] ABSTRACT

An organic film forming apparatus includes a trough storing water therein and a work drive device for moving a work with respect to the trough. The surface of the water is partitioned by a rod into a first developing region on which a monomolecular film is developed and a second developing region on which no monomolecular film is developed. The work is moved by the device through the developed monomolecular film so as to adhere the film on the surface of the work. The device has a holding mechanism which has a holding portion engaged with the work, and which holds the work so that when the work passes through the developed monomolecular film, the holding portion is away from the film or passes through the film after almost the entire work passes through the film.

39 Claims, 29 Drawing Sheets

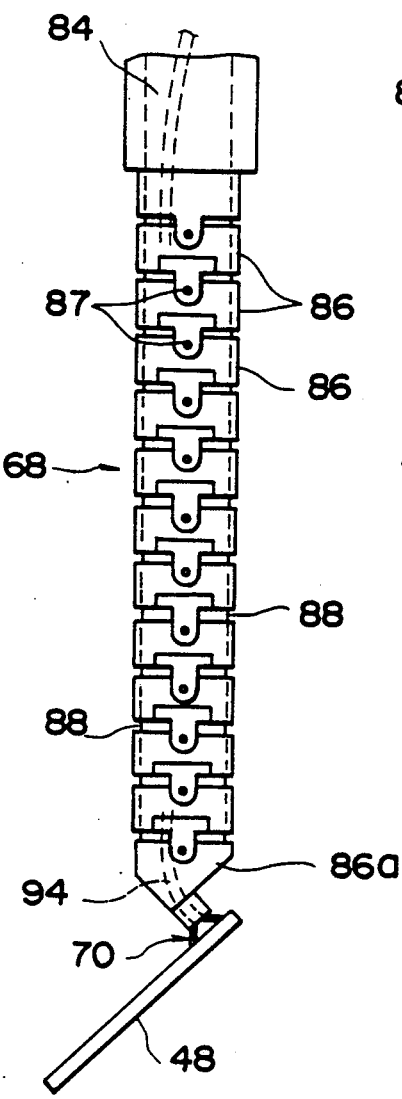
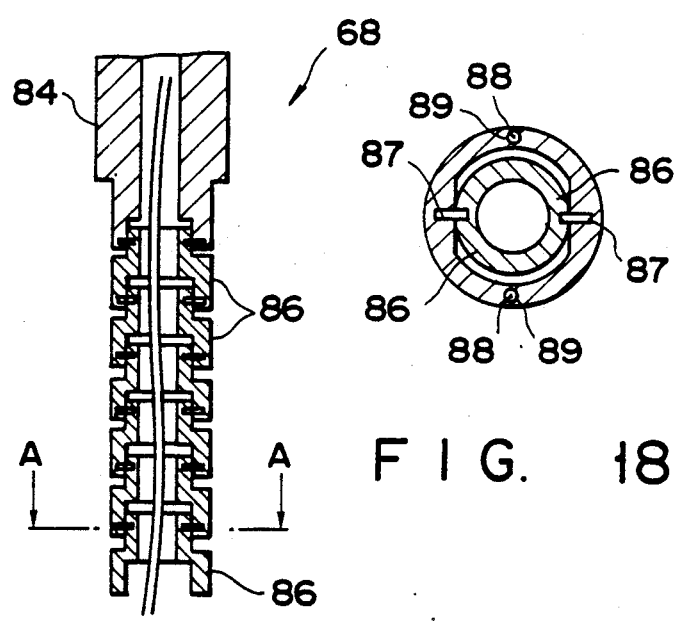
FIG. 18
FIG. 17
FIG. 16

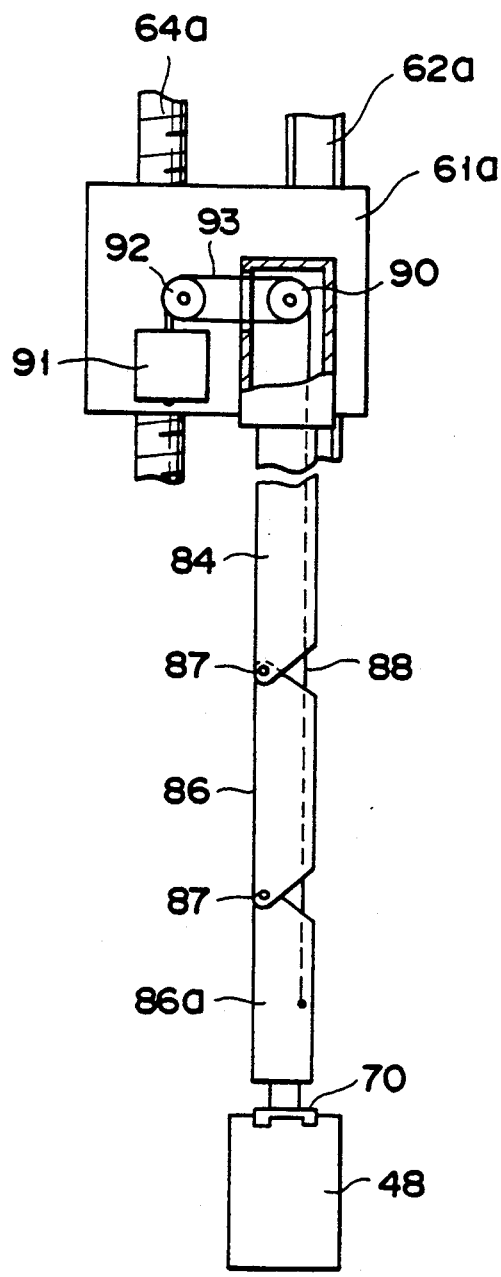
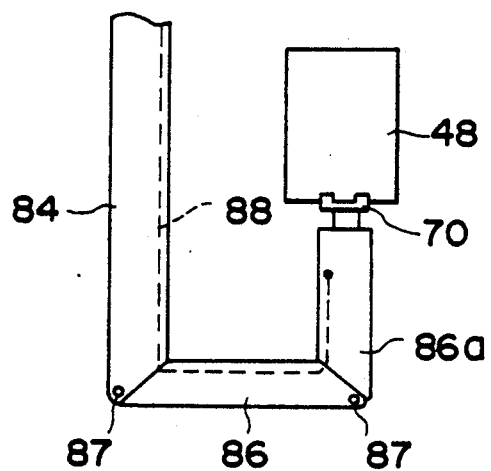
FIG. 22
FIG. 21

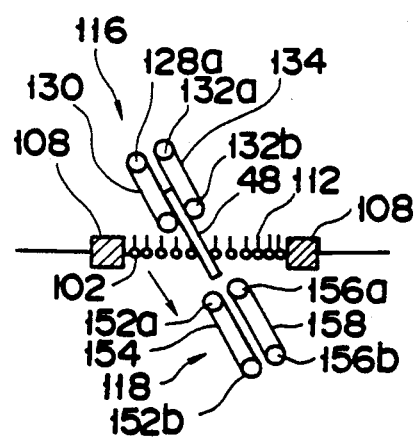
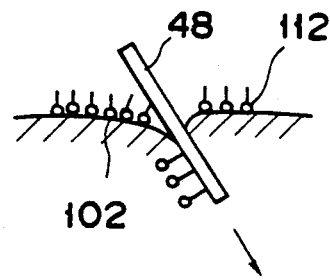
F I G. 24A        F I G. 24B
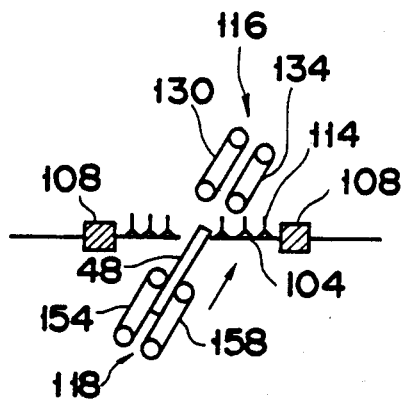
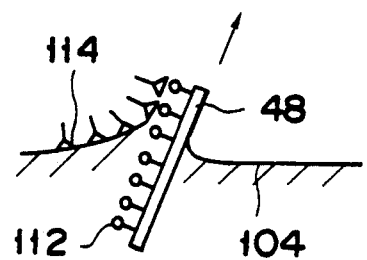
F I G. 25A        F I G. 25B
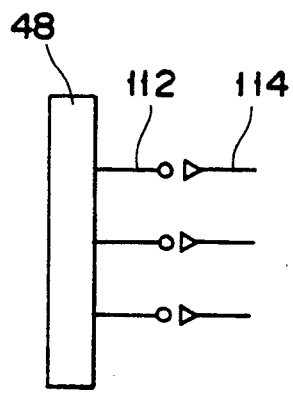
F I G. 26

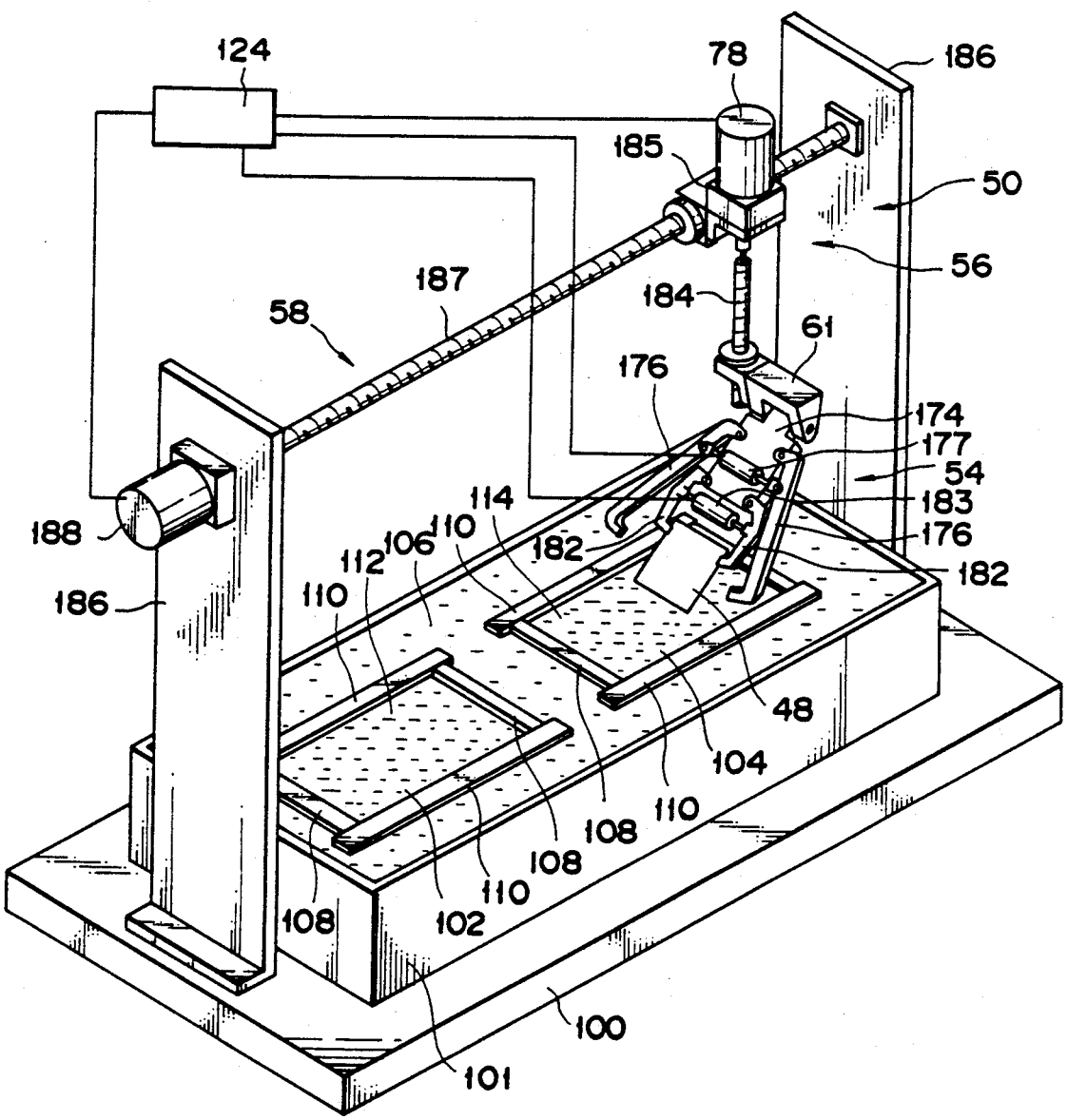
F I G. 27

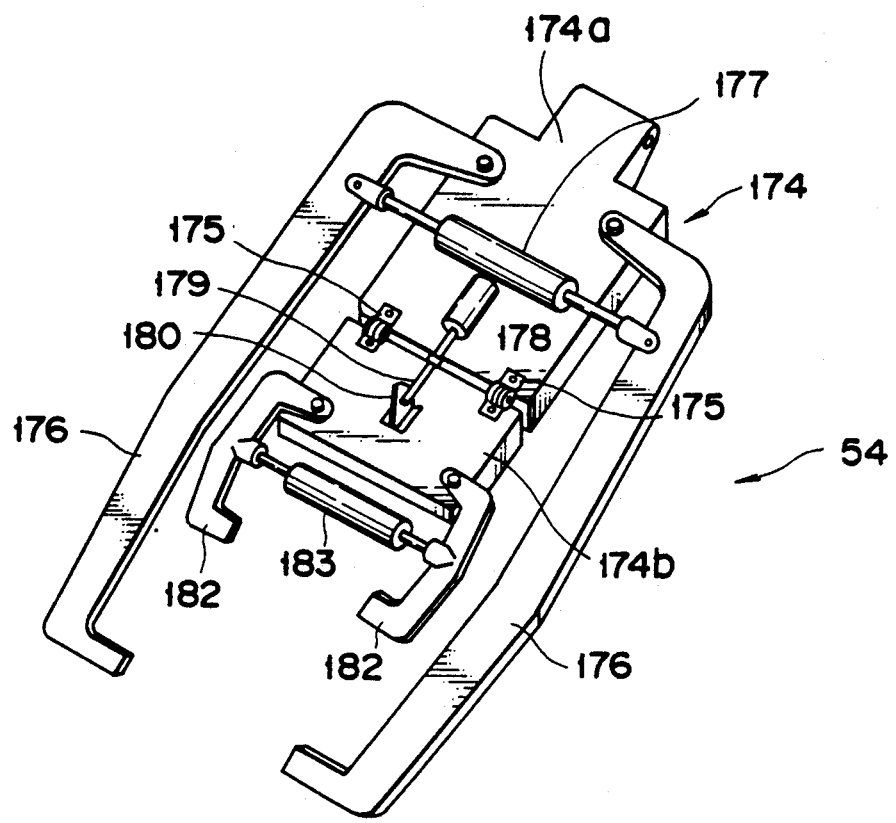
F I G. 28

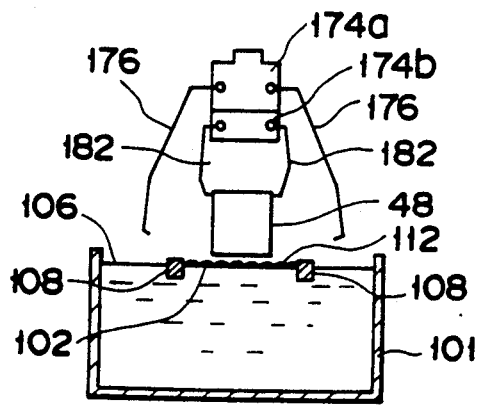
F I G. 29A
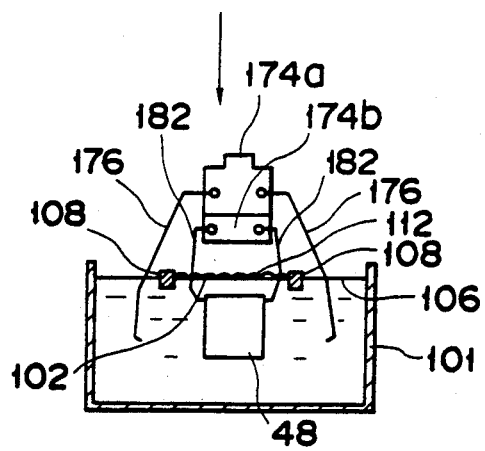
F I G. 29B
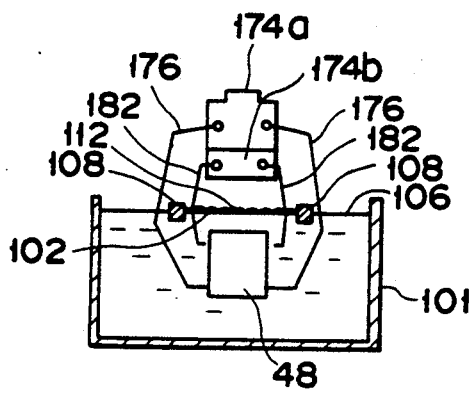
F I G. 29C
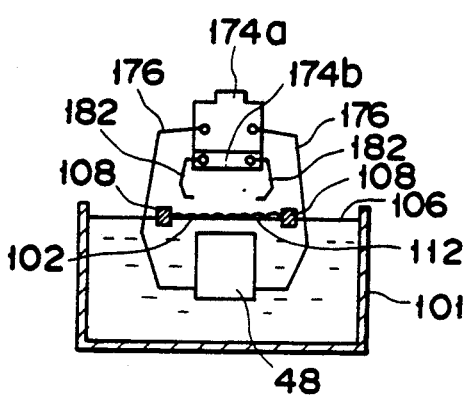
F I G. 29D
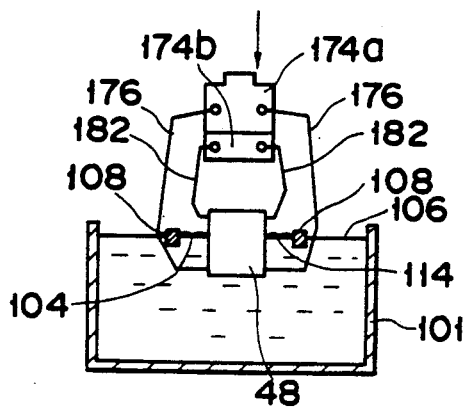
F I G. 29E

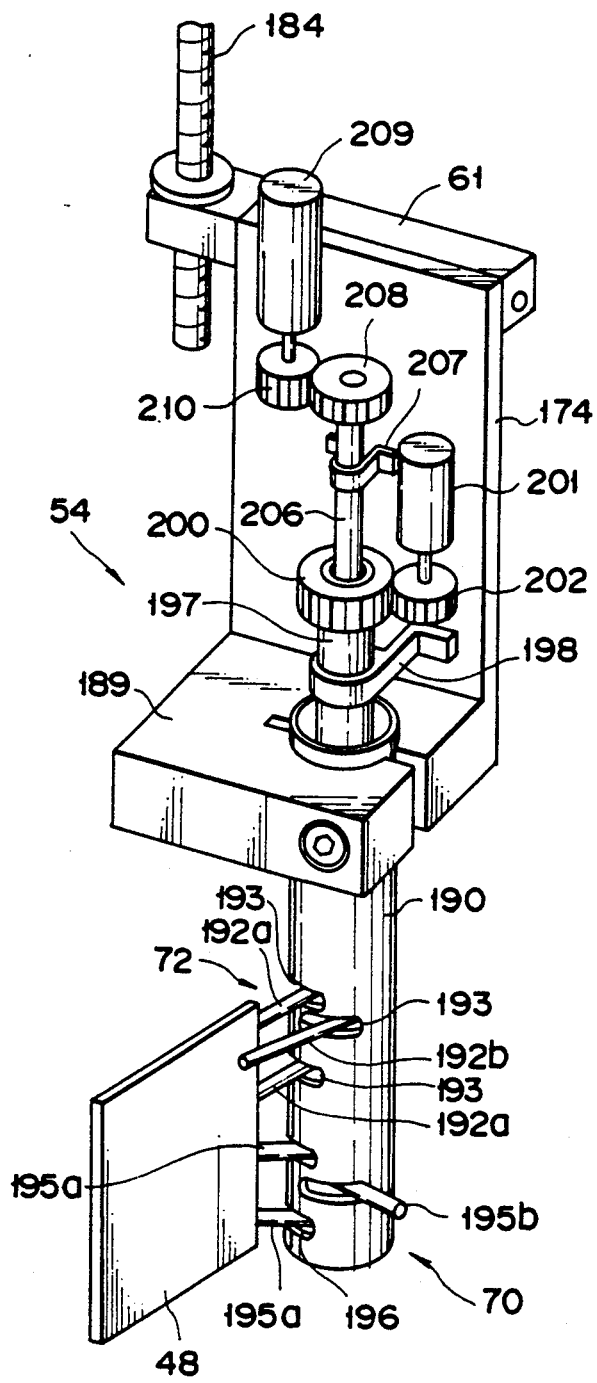
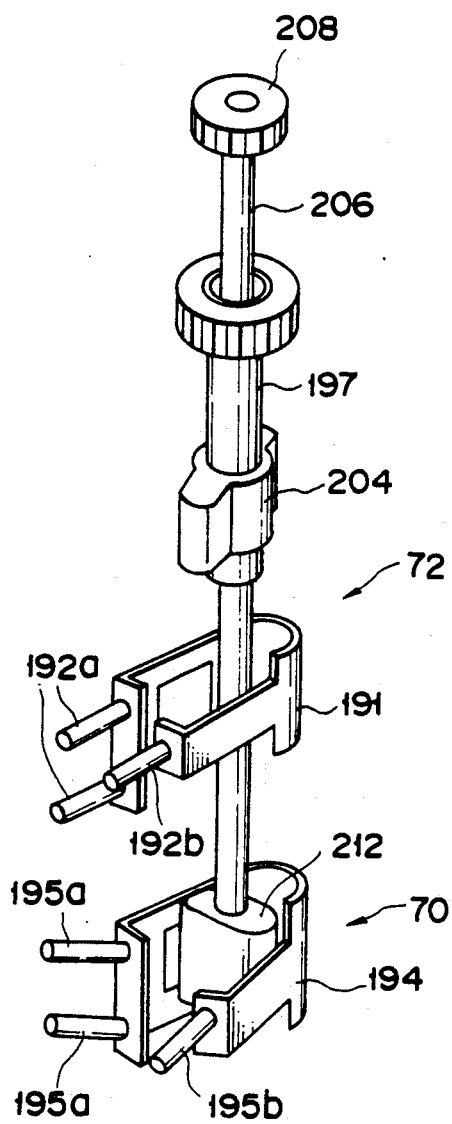
F I G. 30
F I G. 31

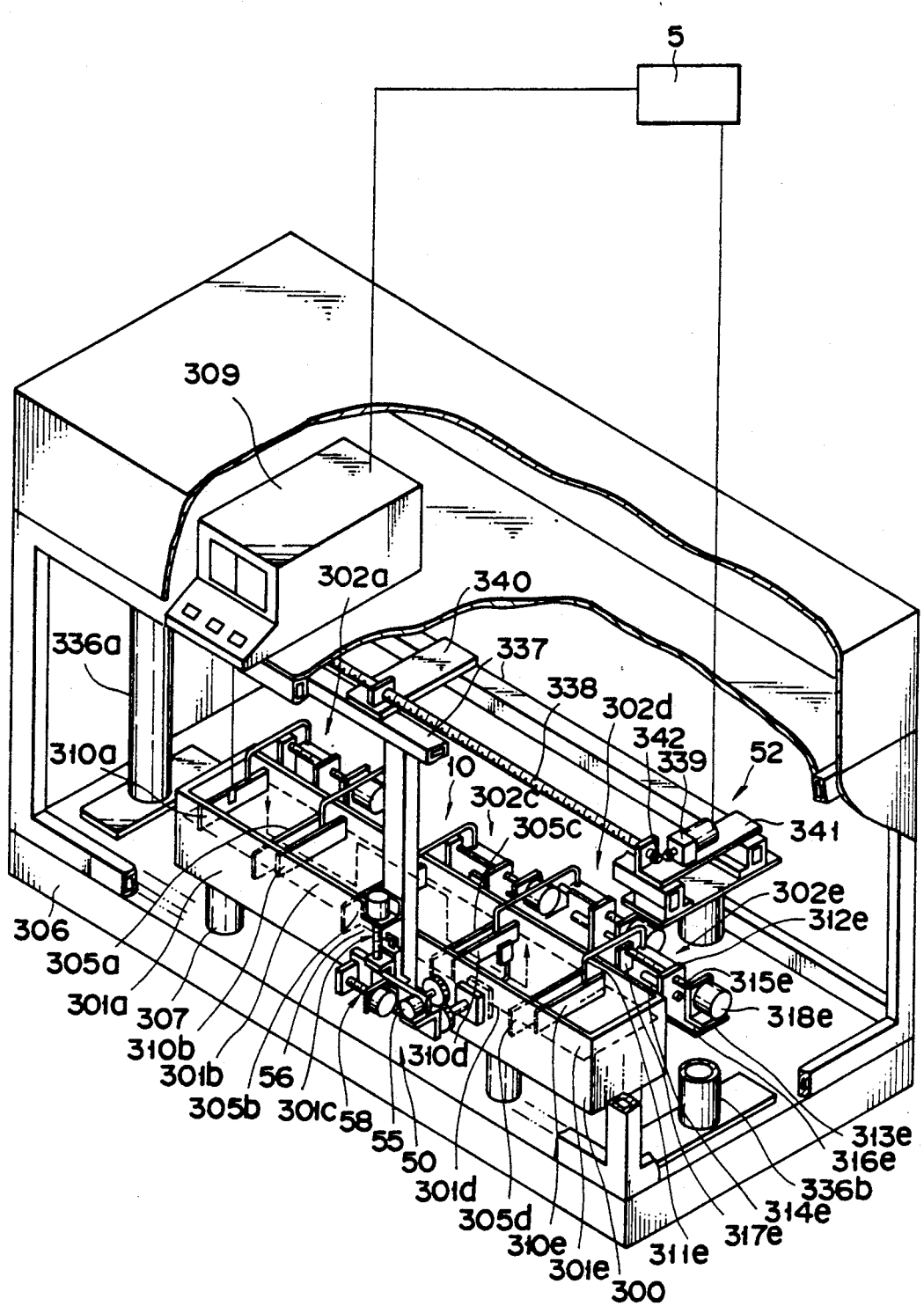
F I G. 33

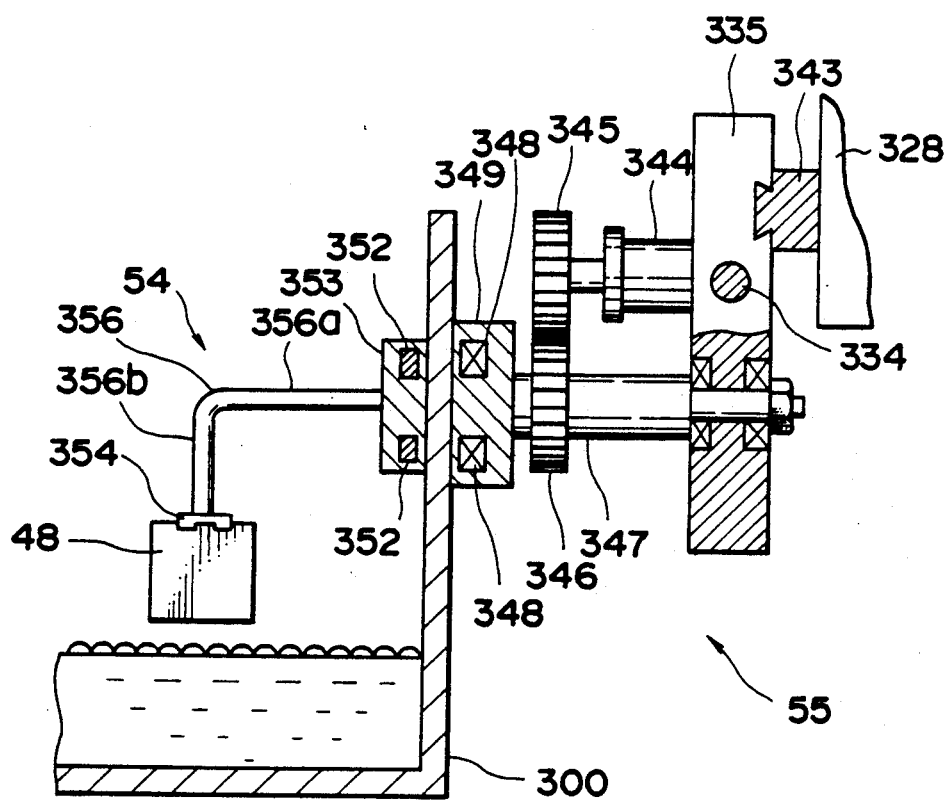
F I G. 35

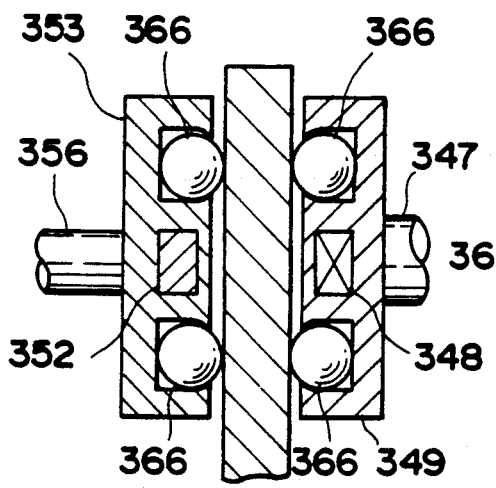
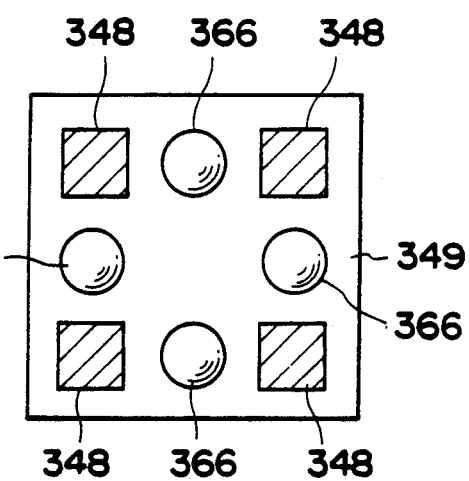
F I G. 42A     F I G. 42B
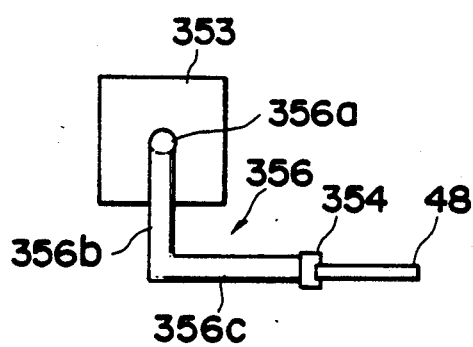
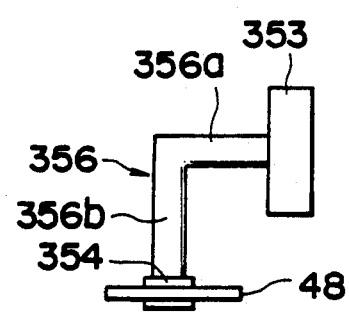
F I G. 43A     F I G. 43B
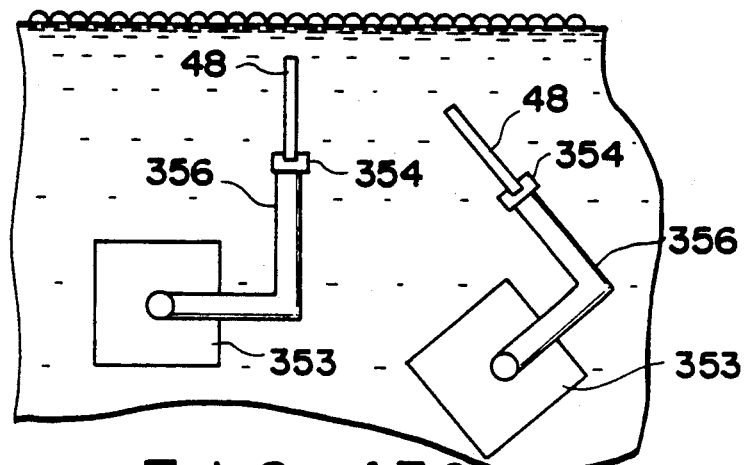
F I G. 43C

APPARATUS FOR FORMING ORGANIC THIN FILM

BACKGROUND OF THE INVENTION

1. Field of the Invention

The present invention relates to a method and apparatus for forming an organic thin film on a substrate surface.

2. Description of the Related Art

In recent years, development of material techniques using organic molecules is remarkable. Along with the development, there is a strong tendency for realizing a new functional element using organic molecules. In particular, extensive studies for developing an element utilizing an ultra thin film using organic molecules have been made.

As a conventional method of forming an organic thin film, a spin-coating method, vacuum deposition method, Langmuir-Brodgett method, and the like are known. Of these methods, the Langmuir-Brodgett method is receiving a lot of attention as the sole thin film forming method with which organic molecules can be oriented and stacked in units of Å. In the following description, the Langmuir-Brodgett method is abbreviated as an LB method, and a film formed by the LB method is referred to as an LB film. An example of an element to which the LB film may be applied includes a MIS light-emitting element and a MIS transistor having an LB film as an insulating film, a photoelectric transducer using pigment molecules, optical recording medium, and various sensors, a piezoelectric element using a polarity film structure, and the like. In addition, an attempt is made to use the LB film as an ultra micropatterning resist.

In the conventional LB method, amphiphilic molecules consisting of single molecules are developed on a water surface, and are compressed to a predetermined surface pressure to form a condensed film. Thereafter, a sample substrate is vertically moved to cross the monomolecular film, thereby building up an organic molecular thin film on the substrate. This method is called a vertical dipping method. In contrast to this, in another method, a sample substrate is brought into parallel contact with a developed monomolecular film, thereby attaching an organic molecular thin film on the substrate. This method is called a horizontal attaching method. The structure of built-up monomolecular film obtained by these methods includes a Y-type wherein hydrophilic group molecules are built up adjacent to each other, while the hydrophobic group molecules are built up adjacent to each other, and X- and Z-types wherein the hydrophobic group molecules are built up to be adjacent to those of the hydrophilic group. When the substrate surface has a hydrophilic property, a hydrophobic group side of a monomolecular film first attached serves as a substrate side, and the hydrophobic group molecules of the next monomolecular film are attached to the hydrophilic group molecules of the first monomolecular film. A built-up film in which the monomolecular films are built up in this manner is called the X-type. A built-up film in which hydrophilic and hydrophobic group molecules are sequentially built up to be adjacent to each other on a substrate surface having a hydrophobic property is called the Z-type.

However, when the monomolecular films are built up while the hydrophilic and hydrophobic group molecules are adjacent to each other, energy at an interface between these films becomes very large. For this reason, the X- and Z-type built-up films have unstable structures in view of energy, and tend to change over time. In order to obtain a good multilayered structure, a Y-type built-up film is effective in any building up method.

In general, in a manufacturing apparatus for manufacturing a monomolecular film, a substrate is held by a holder, and the holder is connected to a lift mechanism through an arm. For example, when a Y-type built-up film is formed on a substrate surface using the manufacturing apparatus, the substrate held on the holder is conveyed to a position above a monomolecular film developed on a liquid surface of a trough, and is dipped in the trough through the monomolecular film by the lift mechanism. In this case, the monomolecular film is attached to the substrate surface. The substrate is then pulled up from the trough through the monomolecular film, and a second monomolecular film layer is attached to the substrate surface.

However, in the manufacturing apparatus, when the substrate is pulled up from the trough, the arm located between the substrate and the lift mechanism passes through the developed monomolecular film prior to the substrate. When the arm passes through the monomolecular film, it may destroy the monomolecular film or change the surface pressure of the monomolecular film. Since the monomolecular film is attached to the substrate surface after the arm passed through the film, a film having high quality cannot be formed on the substrate surface.

SUMMARY OF THE INVENTION

The present invention has been made in consideration of the above situation, and has as its object to provide a forming method and apparatus of an organic thin film, capable of forming a good organic thin film.

In order to achieve the above object, a forming method of the present invention comprises the steps of: defining on a surface of a liquid a plurality of developing regions which are partitioned from each other, and on which organic molecules can be developed; developing a monomolecular film of amphiphilic organic molecules on at least one of the developing regions; conveying a work held by holding means having a holding portion engaged with the work to a position near a desired developing region on which the monomolecular film is developed; and moving the work through the developed monomolecular film so that the holding portion is kept away from the monomolecular film or passes through the monomolecular film after almost the entire work passes through the developed monomolecular film, thereby attaching the monomolecular film on the surface of the work.

A manufacturing apparatus of the present invention comprises: developing means storing a liquid, and having a plurality of developing regions which are partitioned from each other on a surface of the liquid, and on which organic molecules can be developed; work driving means for moving a work in a desired direction through a desired developing region to attach a monomolecular film, developed on the developing region, to the surface of the work when the work passes through the developing region, the work driving means comprising holding means, having a holding portion engaged with the work, for holding the work so that when the work passes through the developing region on which the monomolecular film is developed, the holding portion is kept away from the developing region or passes through the developing region after almost the entire work passes through the developing region on which the monomolecular film is developed; and work moving means for conveying the work held by the holding means among the plurality of developing regions.

BRIEF DESCRIPTION OF THE DRAWINGS

FIGS. 1 to 12C show an organic thin film forming apparatus according to a first embodiment of the present invention, in which FIG. 1 is a partially cutaway perspective view of the apparatus, FIG. 2 is a partially cutaway side view showing a substrate drive device and a trough, FIGS. 3 and 4 are side views showing different operation states of the drive device in correspondence with FIG. 2, and FIGS. 5A to 12C are views showing steps of forming an organic thin film and formed hereto structure films;

FIGS. 16 to 20 show a third modification of the support arm, in which FIG. 16 is a side view of the support arm, FIG. 17 is a longitudinal sectional view of the support arm, FIG. 18 is a sectional view taken along line A—A in FIG. 17, FIG. 19 is a side view showing a state wherein the support arm is bent, and FIG. 20 is a partially cutaway side view showing the step of forming a monomolecular film using the support arm;

FIGS. 21 and 22 show a fourth modification of the support arm, in which FIG. 21 is a side view showing a state wherein the support arm stands upright, and FIG. 22 is a side view showing a state wherein the support arm is bent;

FIGS. 23 to 26 show a forming apparatus according to a second embodiment of the present invention, in which FIG. 23 is a perspective view showing the overall apparatus, FIGS. 24A to 25B are views schematically showing the steps of forming a monomolecular film, and FIG. 26 is a view showing a formed hereto structure film;

FIGS. 27 to 29E show a forming apparatus according to a third embodiment of the present invention, in which FIG. 27 is a perspective view showing the overall apparatus, FIG. 28 is an enlarged perspective view of a holding mechanism, and FIGS. 29A to 29E are views schematically showing the steps of forming a monomolecular film;

FIGS. 30 to 32B show a substrate drive device of a forming apparatus according to a fourth embodiment of the present invention, in which FIG. 30 is a perspective view of the device, FIG. 31 is a perspective view showing an internal structure of the device, and FIGS. 32A and 32B are side views showing the steps of forming a monomolecular film;

FIGS. 33 to 37F show a forming apparatus according to a fifth embodiment of the present invention, in which FIG. 33 is a perspective view showing the overall apparatus, FIG. 34 is a partially cutaway side view of the apparatus, FIG. 35 is a partially cutaway, enlarged, side view of a substrate drive device, FIG. 36 is a partially cutaway side view of the forming apparatus in an operation state different from that illustrated in FIG. 34, and FIGS. 37A to 37F are views schematically showing the steps of forming a monomolecular film;

FIGS. 42A and 42B are respectively a side view and a plan view showing a second modification of the substrate drive device;

FIGS. 43A to 43C show a modification of the holding mechanism, in which FIG. 43A and 43B are a front view and a side view of the holding mechanism, and FIG. 43C is a view showing a state wherein a substrate is dipped in a trough.

DETAILED DESCRIPTION OF THE PREFERRED EMBODIMENTS

Preferred embodiments of the present invention will now be described with reference to the accompanying drawings.

Figure 1:
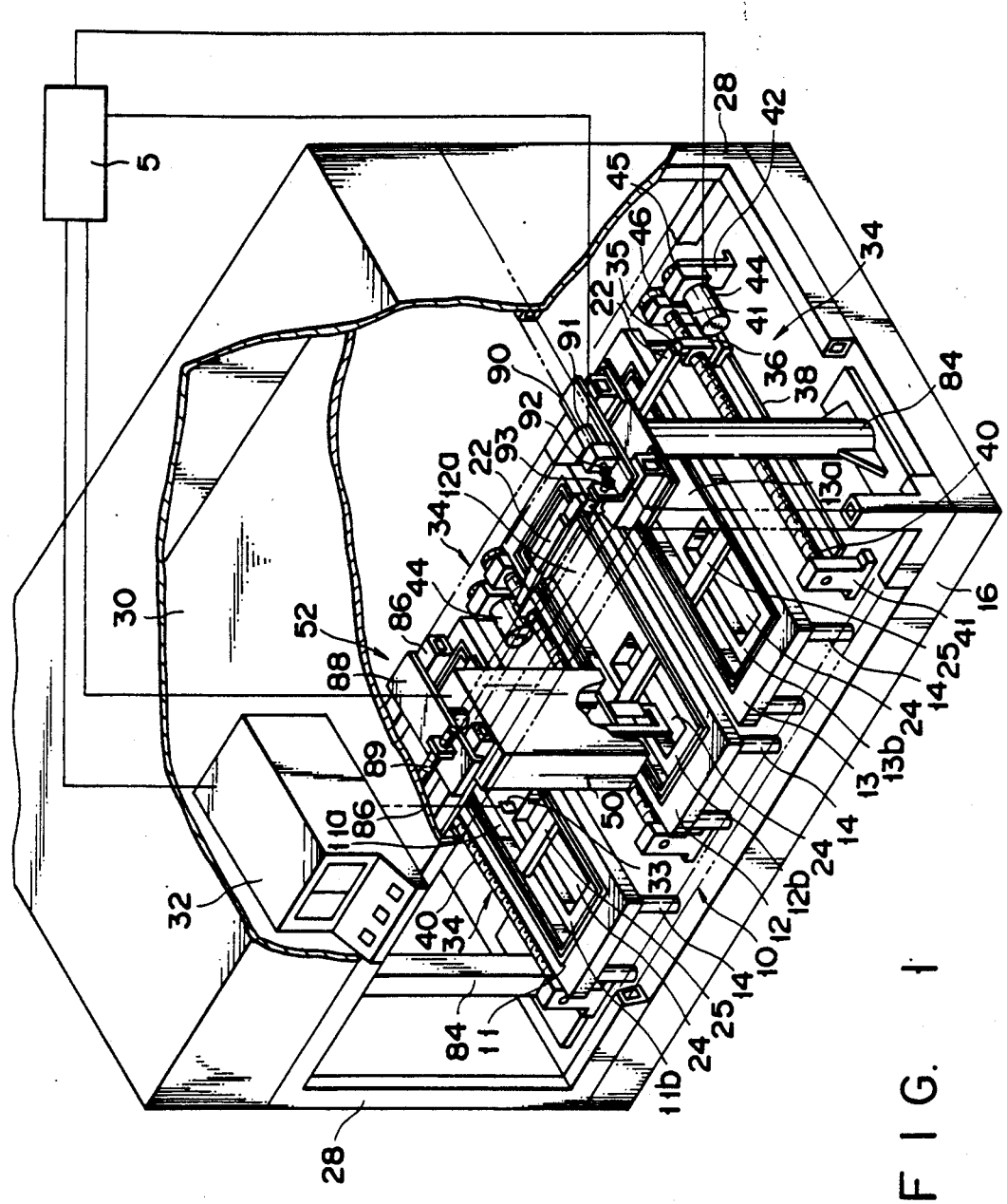
Figure 2:
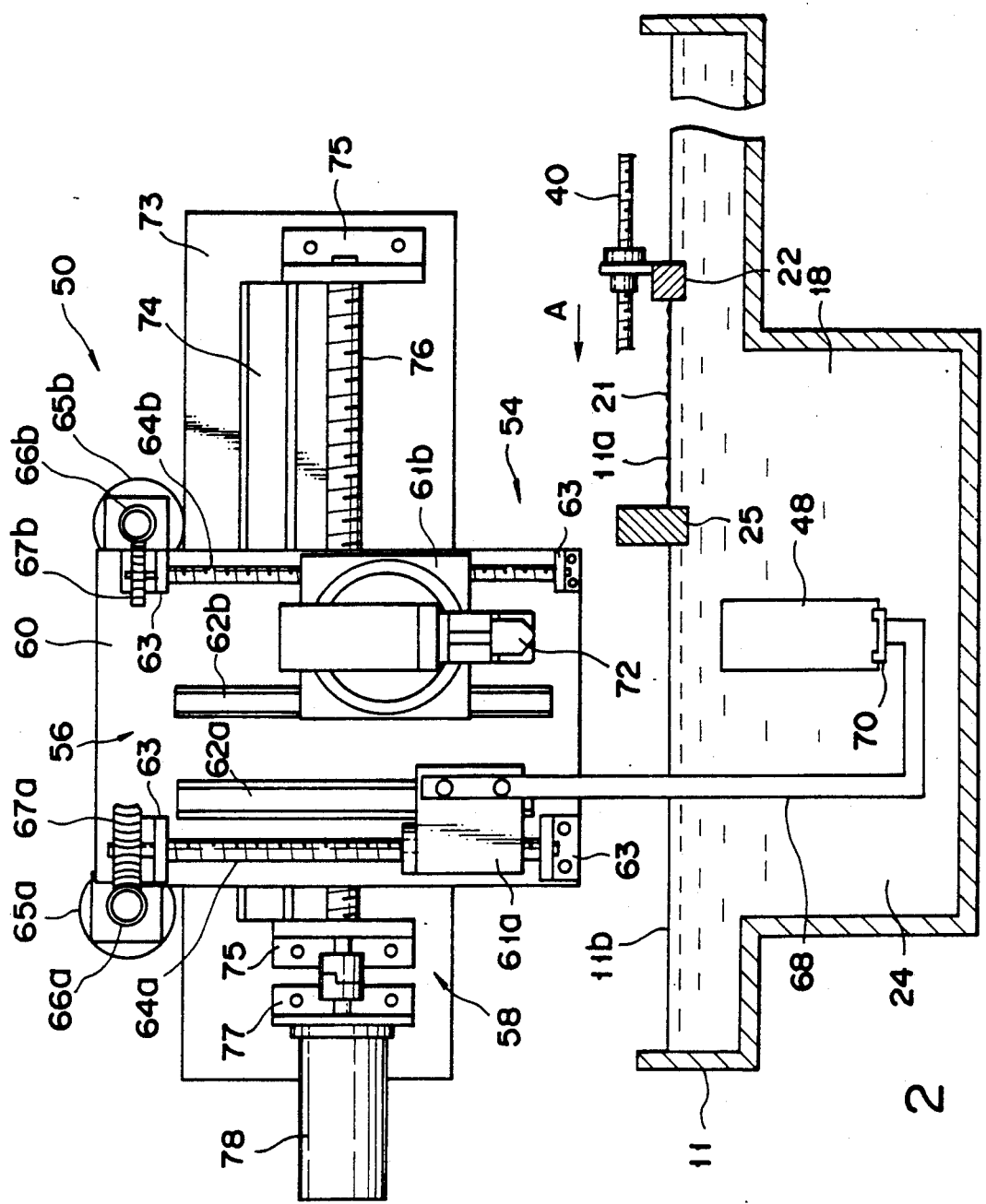

FIG. 1 shows a hetero structure film forming apparatus according to a first embodiment of the present invention. This apparatus comprises, as developing means 10, three independent troughs 11, 12, and 13 for developing three types of amphiphilic organic molecules. Each trough has a rectangular shape. Trough 11, 12, and 13 are horizontally juxtaposed and mounted on anti-vibration base 16 by support legs 14. One trough, e.g., trough 11, will be described in detail. As is shown in FIG. 2, liquid 18, e.g., water, having a predetermined liquid phase composition set to have a predetermined pH, temperature, and ion concentration, is stored in the trough. Trough 11 has groove portion 24 deeper than the remaining portion. The water surface is partitioned into first and second developing regions 11a and 11b by partition rod 25. Desired organic molecules 21 are developed on the water surface of first region 11a, and no molecules are developed on the water surface of second region 11b. On first region 11a is provided movable barrier 22, made of Teflon, of a compression drive mechanism (to be described later) for compressing molecules 21 to form a condensed film at a predetermined surface pressure. Note that other troughs 12 and 13 have the same arrangement as that of trough 11.

Support frame 28 is arranged on base 16 and supports top plate 30. Three surface pressure detectors 32 for detecting surface pressures of monomolecular films developed on the water surfaces of water 18 in troughs 11, 12, and 13 are arranged on top plate 30. FIG. 1 illustrates only one detector 32 corresponding to trough 11. In practice, however, detectors having the same arrangement are arranged in correspondence with troughs 12 and 13, respectively. A Wilhelmy type detector employing, e.g., an electronic balance, is used as detector 32. The electronic balance suspends filter paper 33 in water 18 to measure the surface tension of a molecular film developed on the water surface.

Three independent compression drive mechanisms 34 are arranged on base 16 in correspondence with troughs 11, 12, and 13, respectively. Drive mechanism 34 corresponding to trough 13 will be explained. This drive mechanism comprises movable barrier 22, made of Teflon, for developing and compressing monomolecules on first developing region 13a. Barrier 22 has a rod shape and extends across the entire width of trough 13, i.e., parallel to partition rod 25. One end of barrier 22 is fixed to support base 36 through leaf spring 35. Support base 36 is slidably placed on guide rail 38 fixed on base 16, and is threadably engaged with feed screw 40. Two ends of feed screw 40 are rotatably supported by support posts 41 standing upright on base 16. Guide rail 38 and feed screw 40 extend parallel to each other and along the longitudinal axis of trough 13. The drive force of motor 44, supported on support post 42 fixed on base 16, is transmitted to feed screw 40 through gears 45 and 46. When feed screw 40 is rotated by motor 44, support base 36 is moved along guide rail 38. Thus, as indicated by arrow A in FIG. 1, barrier 22 is moved on the water surface to compress organic molecules floating on the first developing region to the left, thereby forming a condensed monomolecular film having a predetermined surface pressure.

Other mechanisms 34 provided for troughs 11 and 12 have the same arrangement as described above. Note that in this embodiment, mechanisms 34 are located at the left side of troughs and at the right side of trough 13, respectively. This arrangement is made in consideration of an installation space, and may be modified as needed.

The forming apparatus comprises substrate drive device 50 for moving substrate 48, as a work on which a film is formed, to dip it into or raise it out of the water in each trough, and transport device 52 for transporting device 50 above trough 11, 12, or 13. Devices 50 and 52, compression drive mechanisms 34, and surface pressure detectors 32 are connected to control means 5 and controlled thereby.

As is shown in detail in FIG. 2, device 50 has holding mechanism 54 for holding substrate 48, lift mechanism 56 for vertically moving the substrate, and horizontal moving mechanism 58 for horizontally moving the substrate along the longitudinal axis of trough 11. Device 50 comprises support table 60 extending vertically with respect to the water surface of trough 11. Lift mechanism 56 has first and second moving bases 61a and 61b mounted on the support table. Moving base 61a is slidably held on guide rail 62a fixed on support table 60, and is engaged with feed screw 64a mounted on the support table through a pair of support posts 63. Guide rail 62a and feed screw 64a extend parallel to each other and perpendicular to the water surface in trough 11. Motor 65a is fixed to table 60, and the drive force of the motor is transmitted to feed screw 64a through worm gear 66a attached to the rotational shaft of the motor and gear 67a attached to the feed screw. When feed screw 64a is rotated by motor 65a, moving base 61a is vertically moved along guide rail 62a. Second moving base 61b is similarly engaged with vertical guide rail 62b and feed screw 64b mounted on support table 60. When feed screw 64b is rotated through gears 66b and 67b by motor 65b fixed to the support table, moving base 61b is vertically moved along guide rail 62b.

Figure 3:
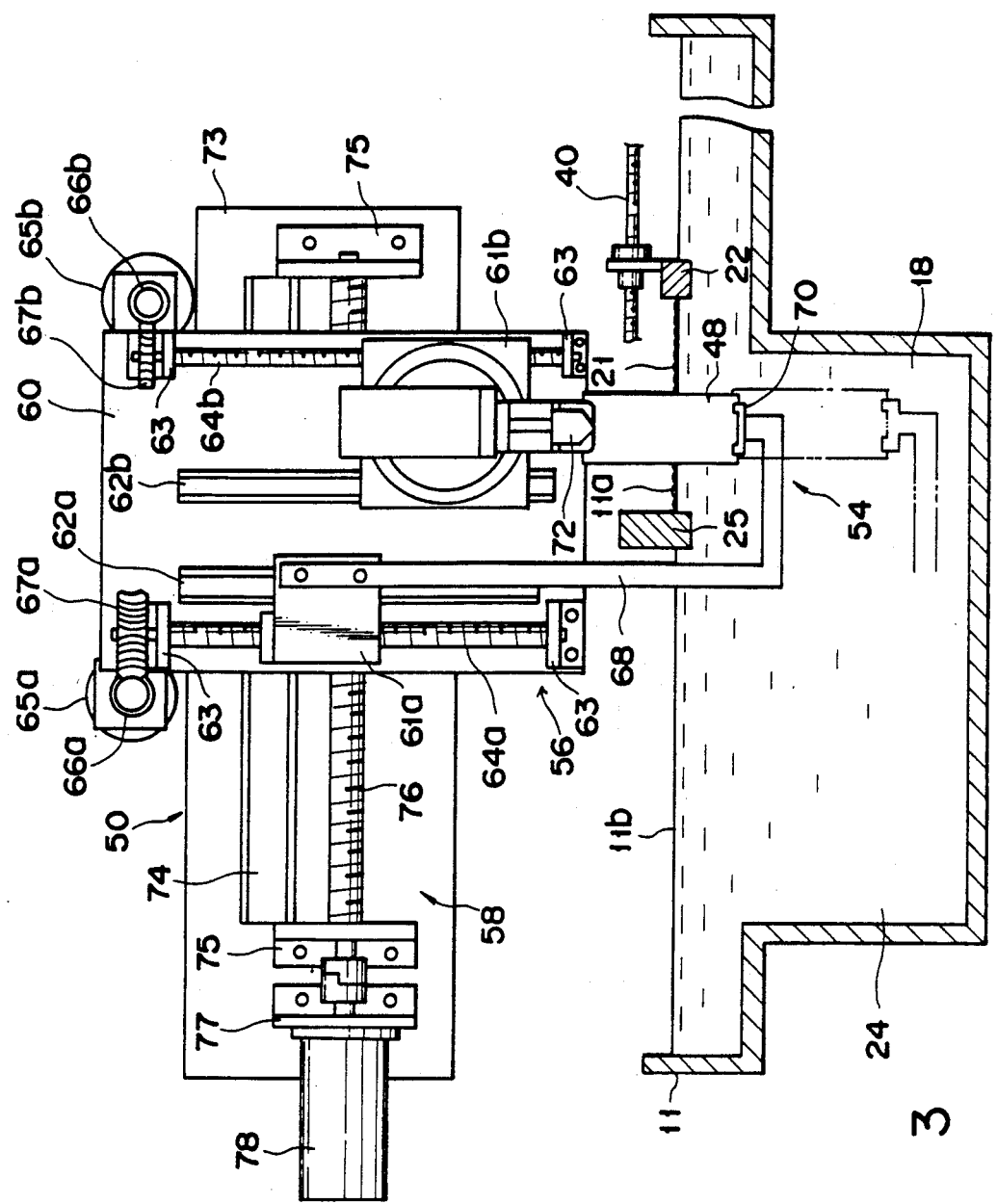

Holding mechanism 54 has L-shaped support arm 68 extending downward from first moving base 61a and to be perpendicular to the water surface in trough 11. First holder 70 for holding substrate 48 is attached to the extended end of the arm. As best illustrated in FIG. 2, holder 70 is engaged with the lower edge of substrate 48, and holds the substrate so that two opposite surfaces of the substrate are perpendicular to the water surface. When moving base 61a is vertically moved, substrate 48 held by holder 70 is dipped into or pulled up from water 18 in the trough. Holding mechanism 54 has second holder 72 formed of a chuck. Holder 72 is supported by second moving base 61b, and holds substrate 48 so that two opposite surfaces of the substrate are perpendicular to the water surface, as is shown in FIG. 3. When moving base 61b is vertically moved, substrate 48 held by holder 72 is dipped into or pulled up from water 18 in the trough.

Support table 60 supporting lift mechanism 56 and holding mechanism 54 is supported by horizontal moving mechanism 58 so as to be horizontally movable. Mechanism 58 has holding table 73. Guide rail 74 is fixed on holding table 73, and feed screw 76 is mounted thereon through a pair of support posts 75. Guide rail 74 and screw 76 horizontally extend along the longitudinal axis of trough 11. Motor 78 is attached to table 73 through support post 77, and is connected to one end of feed screw 76. Support table 60 is guided by guide rail 74, and is engaged with feed screw 76. When feed screw 76 is rotated by motor 78, support table 60 is horizontally moved. Therefore, substrate 48 held by holding mechanism 54 can be moved between the first and second developing regions of the trough.

Substrate drive device 50 with the above arrangement can be transported above troughs 11, 12, and 13 by transporting device 52. As is shown in FIG. 1, device 52 comprises a pair of columns 84 standing upright at the two end portions of base 16, and a pair of guide rails 86 are fixed between both upper ends of the columns. Guide rails 86 horizontally extend parallel to each other above troughs 11, 12, and 13. Moving plate 88 is slidably placed on guide rails 86. Holding table 73 of substrate drive device 50 is suspended from moving plate 88. Moving plate 88 is engaged with feed screw 89 which extends parallel to guide rails 86 and is supported at the two ends of the guide rails through support plates 90. Motor 91 is fixed on one support plate 90, and feed screw 89 is rotated by motor 91 through gears 92 and 93. When feed screw 89 is rotated, device 50 can be moved along guide rails 86 between troughs 11, 12, and 13.

A process of forming a monomolecular film on the surface of substrate 48 using the forming apparatus with the above arrangement will be described.

(1) A case wherein a monomolecular film is attached to the substrate surface when substrate 48 is moved upward and (2) a case wherein the monomolecular film is attached to the substrate surface when substrate 48 is moved downward will be explained using trough 11.

Figure 4:
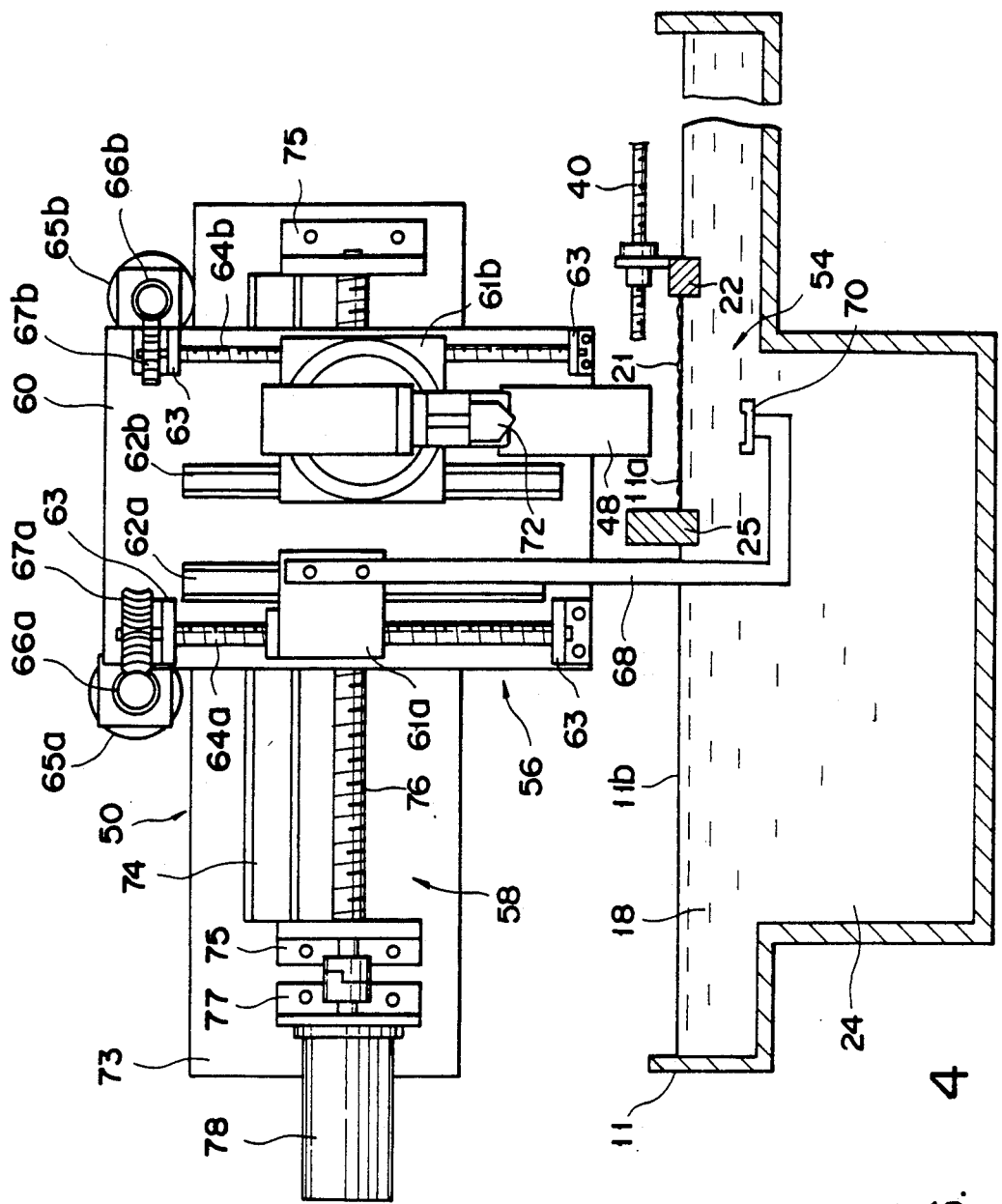

In case (1), as is shown in FIG. 2, support table 60 is moved by horizontal moving mechanism 58 so that first holder 70 is located above the second developing region on which no molecules are developed. After substrate 48 is loaded to holder 70, moving base 61a is moved downward by lift mechanism 56, and substrate 48 is dipped into water 18 together with holder 70 through second developing region 11b. As is indicated by two dots and dashed line in FIG. 3, support table 60 is moved to the right by horizontal moving mechanism 58, so that substrate 48 is moved below first developing region 11a on which molecules 21 are developed. Thereafter, first moving base 61a is slowly moved upward, so that substrate 48 is slowly pulled up through first developing region 11a. At this time, as is shown in FIG. 3, second moving base 61A is moved to the lowermost position. When the upper end of substrate 48 reaches second holder 72, base 61b is moved upward at the same speed as base 61a. In this state, the upper end of substrate 48 is clamped by second holder 72, thereby transferring the substrate from the first holder to the second holder. Then, first moving base 61a is stopped, before first holder 70 reaches first developing region 11a and contacts with developed monomolecular film 21. Thereafter, as is shown in FIG. 4, second moving base 61b is further moved upward, so that substrate 48 is pulled out of the water surface through first developing region 11a. As described above, when substrate 48 passes through the first developing region, monomolecular films can be formed on the two opposite surfaces of substrate 48.

In case (1), after first holder 70 is moved upward near developing region 11a, first base 61a may be stopped and substrate 48 may be transferred from holder 70 to holder 72.

In case (2), as is shown in FIG. 4, horizontal moving mechanism 58 and lift mechanism 56 are driven to set first holder 70 below first developing region 11a and to set second holder 72 above the first developing region. After the upper end of substrate 48 is held by second holder 72, second moving base 61b is moved downward, so that substrate 48 is moved downward through first developing region 11a. As is shown in FIG. 3, when the lower end of substrate 48 reaches first holder 70, first moving base 61a is moved downward and second holder 72 is opened, thereby transferring substrate 48 from holder 72 to holder 70. Before second holder 72 reaches developing region 11a, base 61b is stopped. First moving base 61a is moved downward until entire substrate 48 passes through first developing region 11a, so that monomolecular films are attached to the two surfaces of the substrate. Thereafter, as is shown in FIG. 2, substrate 48 is moved to a position below second developing region 11b by horizontal moving mechanism 58, and first moving base 61a is then moved upward, thereby pulling up the substrate from trough 11 through second developing region 11b.

In case (2), after second holder 72 is moved downward near developing region 11a and second base 61b is stopped, substrate 48 may be transferred from holder 72 to holder 70.

A method of forming a hetero structure film on the substrate surface by performing the above-mentioned attaching process for a plurality of troughs will be described.

Figure 5A:
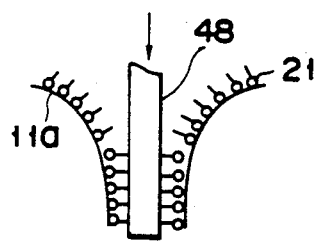
Figure 5B:
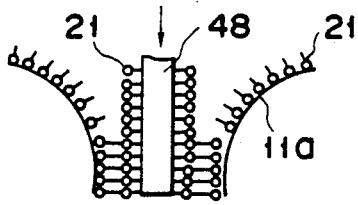
Figure 5C:
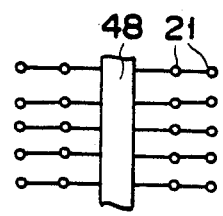

(a) As is shown in FIG. 5A, substrate 48 held by second holder 72 is moved downward through monomolecules 21 developed on, e.g., first developing region 11a of trough 11, thereby forming a first monomolecular thin layer on each substrate surface. After the substrate is transferred from second holder 72 to first holder 70, the substrate is pulled up from the trough through second developing region 11b, and the pulled up substrate is transferred to the second holder again. Thereafter, as is shown in FIG. 5B, substrate 48 is moved downward through first developing region 11a, thus forming a second monomolecular thin layer on each substrate surface. Thus, as is shown in FIG. 5C, a X-type built-up film in which identical molecules 21 are built up in the order of the hydrophobic group, hydrophilic group, hydrophobic group, and hydrophilic group can be formed on each substrate surface.

Figure 6A:
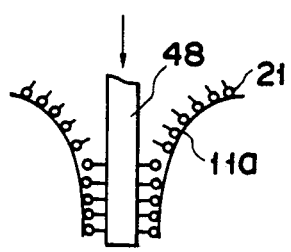
Figure 6B:
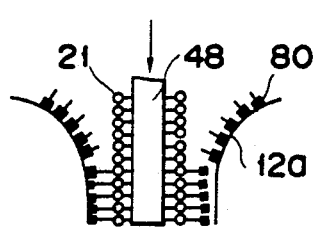
Figure 6C:
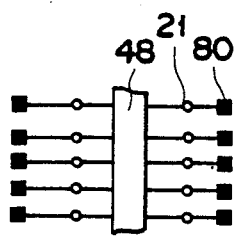

(b) As is shown in FIG. 6A, substrate 48 held by second holder 72 is moved downward through monomolecular film 21 developed on first developing region 11a, thus forming a first monomolecular thin layer on each substrate surface. After substrate 48 is pulled up through second developing region 11b, substrate drive device 50 is conveyed to a position above trough 12 by device 52. Substrate 48 held by second holder 72 is dipped into trough 12 through monomolecular film 80 developed on first developing region 12a, thus forming a second monomolecular thin layer on substrate 48. Thus, as is shown in FIG. 6C, a X-type built-up film consisting of different monomolecules can be formed on each substrate surface.

Figure 7A:
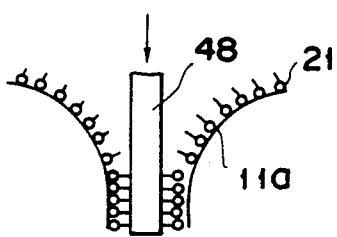
Figure 7B:
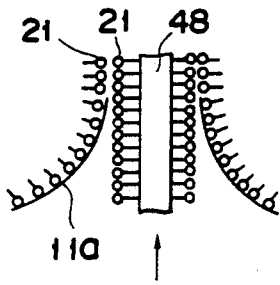
Figure 7C:
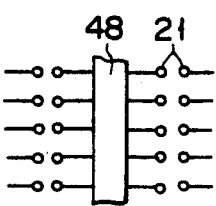

(c) As is shown in FIG. 7C, substrate 48 held by second holder 72 is dipped into trough 11 through first developing region 11a, thus forming first monomolecular thin layer 21 on each substrate surface. After substrate 48 is transferred to first holder 70, it is pulled up from trough 11 through first developing region 11a, thus forming second monomolecular thin layer 21 on each substrate surface. Thus, as is shown in FIG. 7C a Y-type built-up film in which identical monomolecules are built up in the order of hydrophobic group, hydrophilic group, hydrophilic group, and hydrophobic group can be formed on each substrate surface.

Figure 8A:
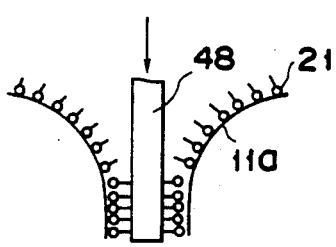
Figure 8B:
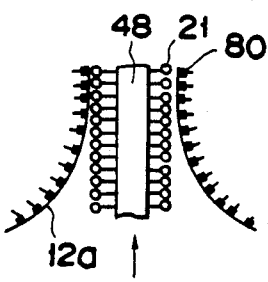
Figure 8C:
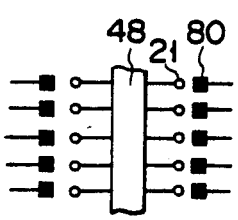

(d) As is shown in FIG. 8A, substrate 48 is dipped into trough 11 through first developing region 11a, thus forming a first monomolecular thin layer on each substrate surface. After substrate 48 is moved in water 18, it is pulled up from trough 11 through second developing region 11b. Then substrate drive device 50 is moved above trough 12, substrate 48 is dipped into trough 12 through second developing region 12b. As is shown in FIG. 8B, after substrate 48 is moved to a position below first developing region 12b, it is pulled up from trough 12 through monomolecular film 80 developed on first developing region 12a. Thus, as is shown in FIG. 8C, a Y-type built-up film consisting of different monomolecules is formed on each surface of substrate 48.

Figure 9A:
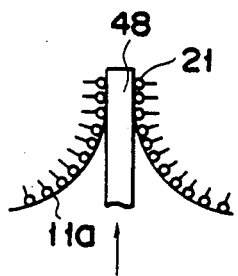
Figure 9B:
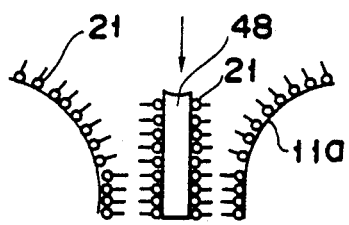
Figure 9C:
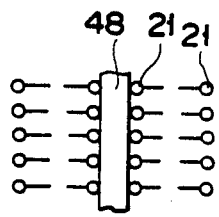

(e) As is shown in FIG. 9A, after substrate 48 is dipped into trough 11 through second developing region 11b, it is pulled up from the trough through first developing region 11a, thus forming monomolecular film 21 on each substrate surface. As is shown in FIG. 9B, then, substrate 48 is dipped into trough 11 through first developing region 11a so as to form second monomolecular thin layer 21 on each substrate surface. Thus, as is shown in FIG. 9C, a Y-type built-up film in which identical monomolecules are built up in the order of hydrophilic group, hydrophobic group, hydrophobic group, and hydrophilic group can be formed on each substrate surface.

Figure 10A:
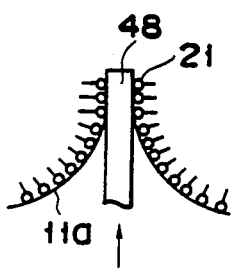
Figure 10B:
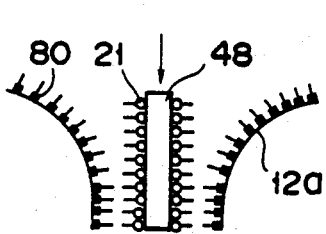
Figure 10C:
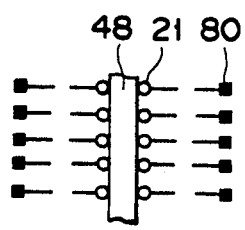

(f) As is shown in FIG. 10A, substrate 48 is dipped into trough 11 through second developing region 11b, and is then pulled up therefrom through first developing region 11a, thus forming monomolecular film 21 on each substrate surface. As is shown in FIG. 10B, after substrate 48 is conveyed above trough 12, it is dipped thereinto through first developing region 12a, thereby forming second monomolecular thin layer 80 on each substrate surface. Thus, as is shown in FIG. 10C, a Y-type built-up film consisting of different monomolecules can be formed on each substrate surface.

Figure 11A:
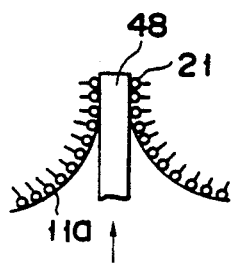
Figure 11B:
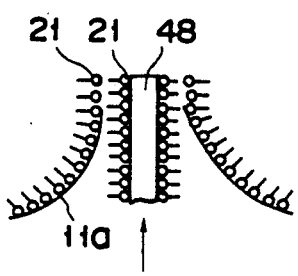
Figure 11C:
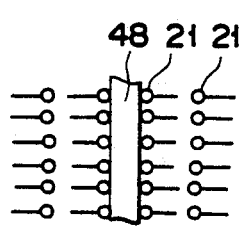

(g) As is shown in FIG. 11A, after substrate 48 is dipped into trough 11 through second developing region 11b, it is pulled up therefrom through first developing region 11a, thus forming monomolecular film 21 on each substrate surface. As is shown in FIG. 11B, after substrate 48 is dipped into the trough through second developing region 11b, it is pulled up therefrom through first developing region 11a, thus forming second monomolecular thin layer 21 on each substrate surface. In this manner, as is shown in FIG. 11C, an Z-type built-up film in which identical monomolecules are built up in the order of hydrophilic group, hydrophobic group, hydrophilic group, and hydrophobic group can be formed on each substrate surface.

Figure 12A:
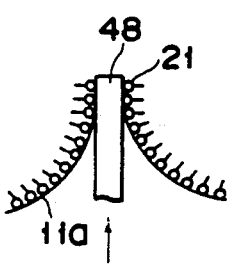
Figure 12B:
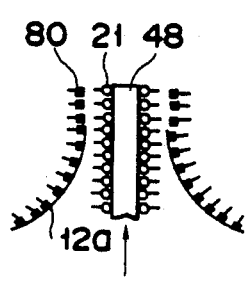
Figure 12C:
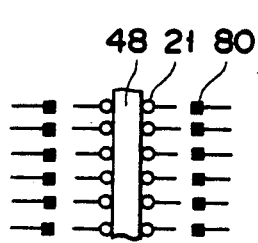

(h) As is shown in FIG. 12A, after substrate 48 is dipped into trough 11 through second developing region 11b, it is pulled up therefrom through first developing region 11a, thus forming monomolecular film 21 on each substrate surface. Then, substrate 48 is conveyed to a position above trough 12. As is shown in FIG. 12B, after substrate 48 is dipped into trough 12 through second developing region 12b, it is pulled up therefrom through first developing region 12a, thus forming second monomolecular thin layer 80 on each substrate surface. Thus, as is shown in FIG. 12C, a Z-type built-up film consisting of different monomolecules can be formed on each substrate surface.

As described above, a plurality of types of monomolecular films can be built up and formed in various combinations by combining upward/downward operations of the substrate and convey operations between the water troughs.

In the above process, the substrate is vertically moved with respect to one or two troughs so as to form a two-layered monomolecular film on each substrate surface. When the substrate is vertically moved a plurality of times with respect to the three troughs, a multilayered monomolecular film having three or more different layers can be built up on each substrate surface.

According to the forming apparatus with the above arrangement, first and second holders 70 and 72 for holding substrate 48 are arranged such that when a substrate is moved upward or downward through a developing region on which monomolecules are developed, the holders do not pass at all through this developing region. Similarly, support arm 68 supporting first holder 70 is formed into an L shape, and is arranged to cross the second developing region on which no monomolecules are developed. Therefore, vertical movement of the substrate can be performed without adversely influencing the developed monomolecular film by the first and second holders and the support arm. More specifically, a monomolecular film before being attached to the substrate can be prevented from being destroyed by the first and second holders and the support arm or its surface pressure can be prevented from being changed thereby. As a result, a good monomolecular film can be formed on each substrate surface. It is noted that if after almost the entire substrate passes through the developed monomolecular film, first and second holders 70, 72 may pass this film. Also in this case, a good monomolecular film can be formed.

Since troughs 11, 12, and 13 are independently arranged, monomolecules developed on these troughs can be prevented from being mixed with each other and deteriorated. The water phase, e.g., the pH, temperature, and ion concentration, of stored water can be arbitrarily set for each trough in correspondence with monomolecules to be developed. As a result, a selection range of available monomolecules can be widened.

In the above embodiment, three troughs are used. However, the present invention is effective when at least one trough is arranged. Four or more troughs may be used so that various types of molecules are developed to form a hetero structure film having a complicated structure. The present invention is not limited to the above arrangement wherein a plurality of independent troughs are used. For example, a single trough can be partitioned into a plurality of independent developing regions by partition plates or the like. The arrangement of the drive device for vertically moving a substrate and the arrangement of the transporting device for transporting a substrate may be modified as needed.

In the above embodiment, horizontal moving mechanism 58 is driven to move substrate 48, thereby conveying the substrate between the first and second developing regions. However, in contrast to this, substrate 48 may be fixed in position, and partition rod 25 and movable barrier 22 may be moved to move the first and second developing regions.

Figure 13:
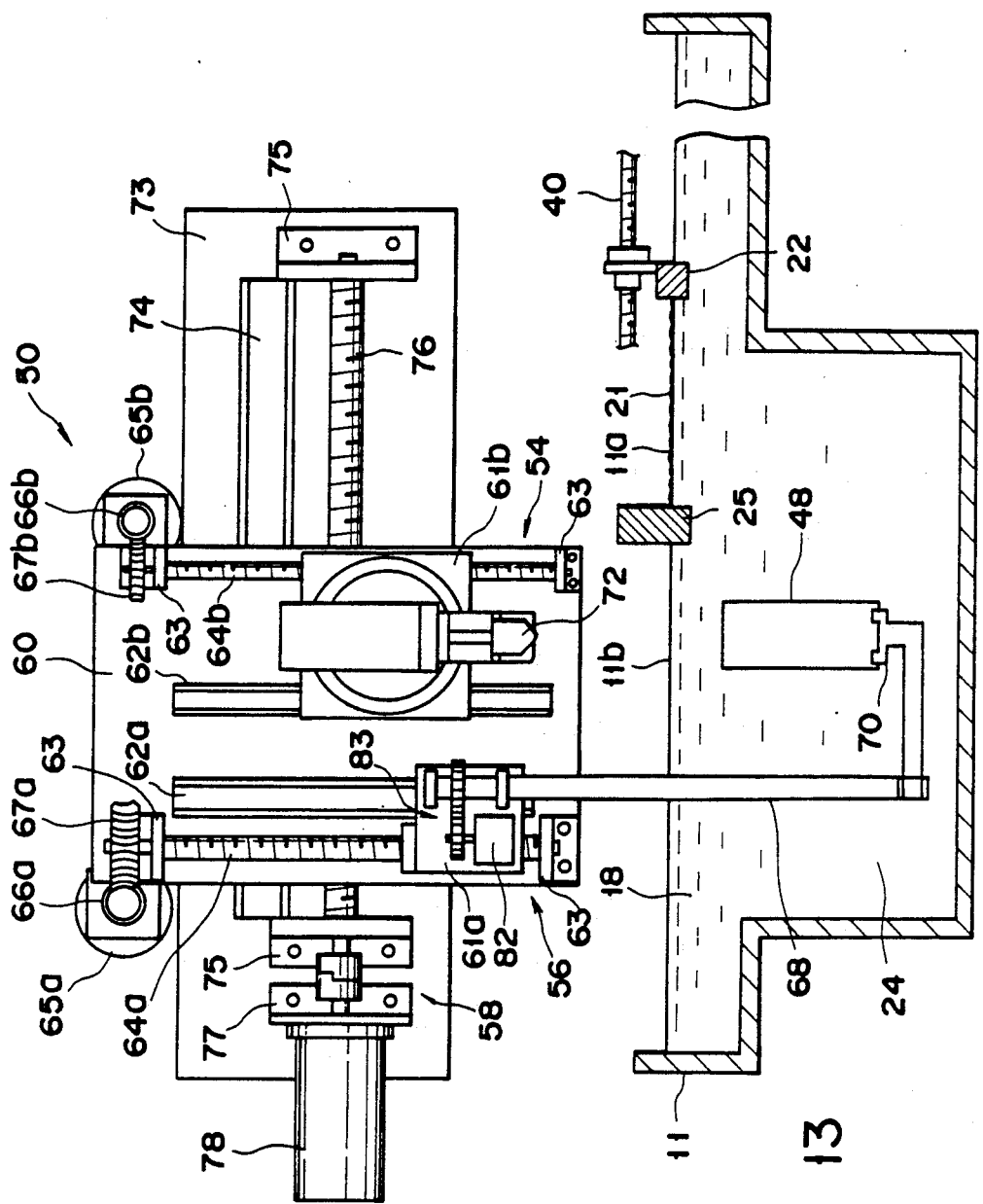
FIGS. 13 and 14 are a side view corresponding to FIG. 2 and a partially cutaway plan view which show a first modification of a support arm.
Figure 14:
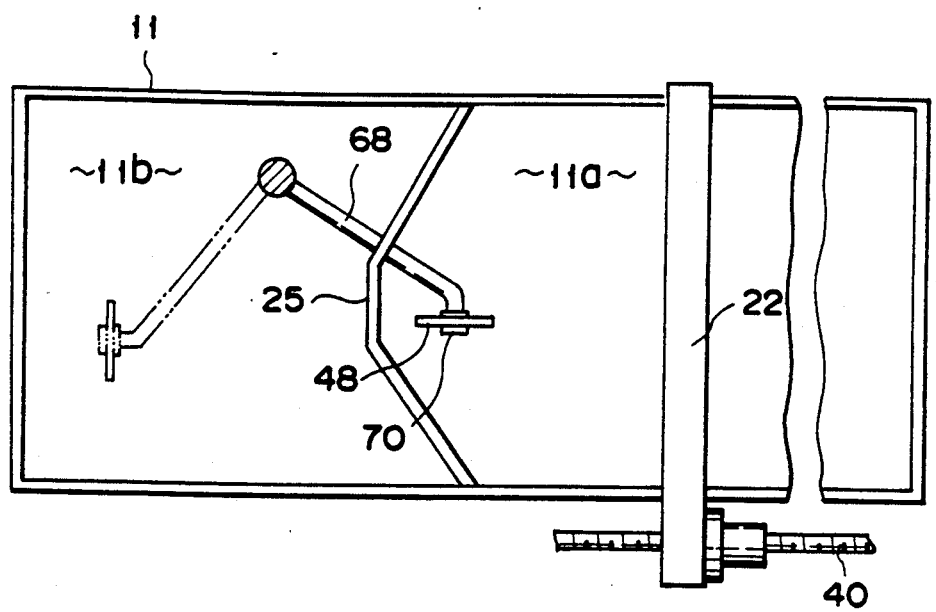

As is shown in FIGS. 13 and 14, support arm 68 may be rotated to convey substrate 48 between the first and second developing regions. More specifically, the upper end portion of support arm 68 is supported by first moving base 61a to be rotatable about an axis perpendicular to the water surface of the water in the trough. Motor 82 is mounted on moving base 61a, and the rotational shaft of the motor is connected to support arm 68 through gear train 83. Therefore, when motor 82 is driven to rotate support arm 68, substrate 48 held by first holder 70 can be conveyed between the first and second developing regions, as is shown in FIG. 14. In this case, if the rotational center of support arm 68 is located within the second region on which no molecules are developed, a vibration or the like upon movement of the substrate does not adversely influence the monomolecules developed on the first developing region.

Figure 15:
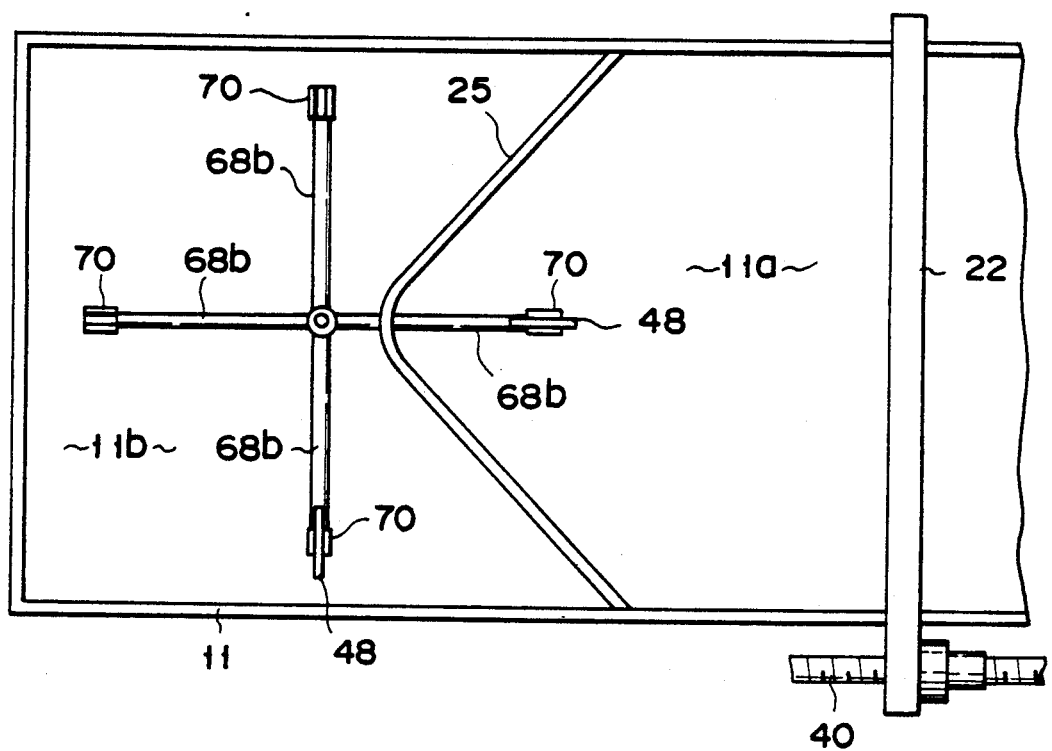
FIG. 15 is a plan view showing a second modification of the support arm.

As is shown in FIG. 15, support arm 68 may comprise a plurality of, e.g., four horizontal portions 68b radially extending from the lower end of the upright portion the arm, and first holder 70 may be arranged at the distal end of each horizontal portion. In this case, when support arm 68 is rotated, an arbitrary substrate held by first holder 70 can be conveyed between the first and second developing regions.

In the above modifications, horizontal moving mechanism 58 of the substrate drive device may be omitted. The shape of partition rod 25 is not limited to a linear shape, and its central portion may be bent toward second developing region 11b, as is shown in FIGS. 14 and 15. In this case, compression of monomolecules developed on first developing region 11a can be facilitated.

Figure 19:
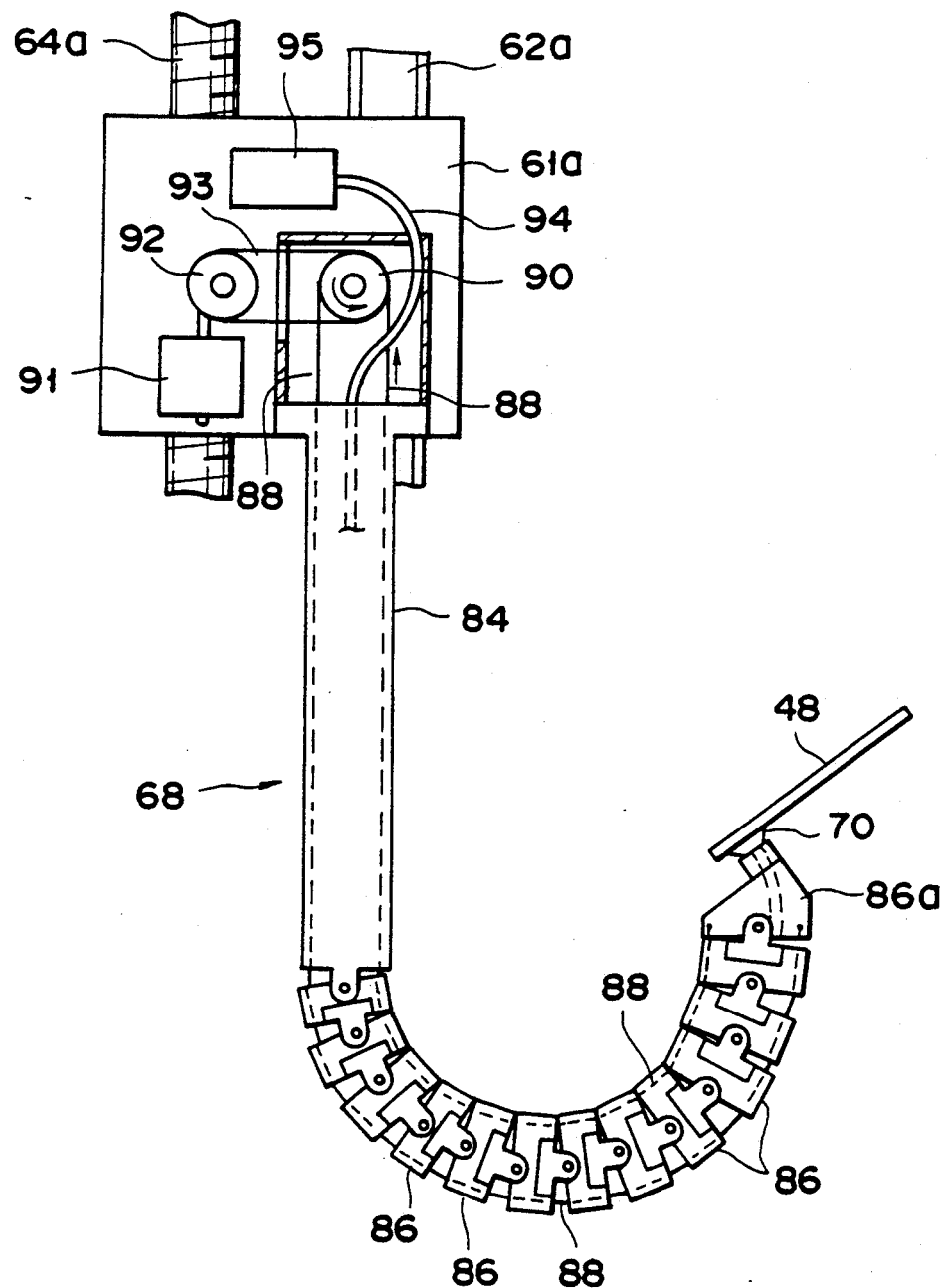

As is shown in FIGS. 16 to 19, support arm 68 may have a multi-joint structure. More specifically, support arm 68 has cylindrical stationary rod 84 extending vertically downward from first moving base 61a and a large number of joint members 86 coupled to the lower end of the rod. Each joint member 86 has a cylindrical shape, and is pivotally coupled to adjacent joint members through a pair of pins 87. Although two adjacent joint members 86 can only be rotated through an angle of 20° to 30°, the joint members as a whole, i.e., joint member 86a at the distal end can be rotated through 180° with respect to stationary rod 84. A vacuum chuck constituting first holder 70 is attached to distal-end joint member 86a. The chuck is connected to pump 95, mounted on moving base 61a, through suction tube 94 extending through support arm 68. Therefore, when the interior of the chuck is set at a negative pressure by driving pump 95, substrate 48 can be sucked by the chuck. A pair of wires 88 are fixed to distal-end joint member 86a at positions separated by a 180° angular interval. These wires extend in through holes 89 formed in each joint member and stationary rod 84 and are guided to the upper end of rod 84. Wires 88 are coupled to pulley 90 mounted on moving base 61a. Pulley 90 is rotated, through pulley 92 and belt 93, in an arbitrary direction and at an arbitrary speed by motor 91 fixed on moving base 61a. For example, when pulley 90 is rotated counterclockwise from a state wherein support arm 68 stands upright, as is shown in FIG. 16, substrate 48 sucked by first holder 70 can be turned counterclockwise through 180°, as is shown in FIG. 19. When pulley 90 is rotated clockwise, substrate 48 can be turned clockwise through 180°.

The process of forming a monomolecular film on a substrate surface using the forming apparatus having support arm 68 with the above arrangement will be explained.

Figure 20:
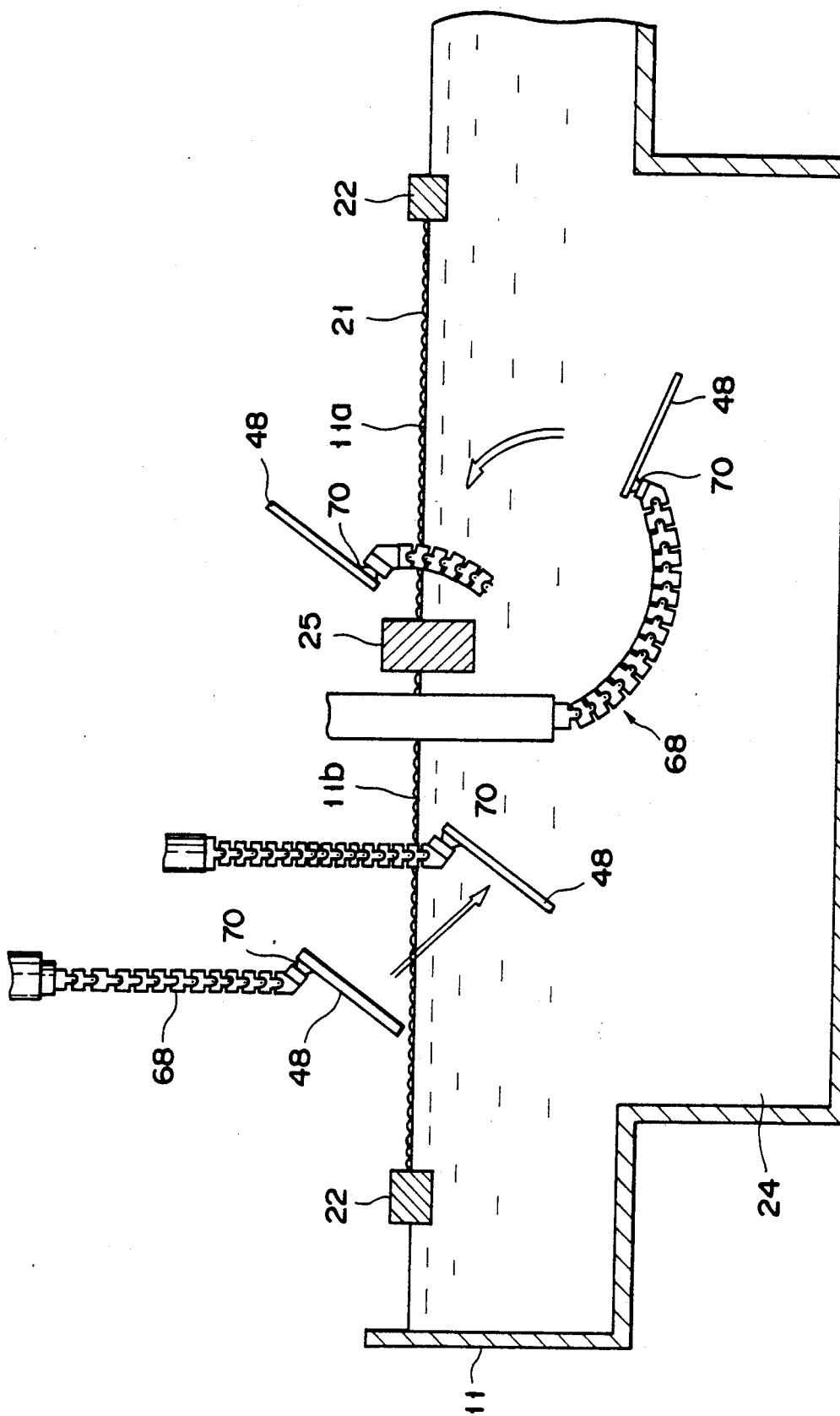

As is shown in FIG. 20, substrate 48 held by first holder 70 is conveyed to a position above, e.g., second developing region 11b of trough 11. Moving base 61a is then moved downward, so that substrate 48 is dipped into trough 11 through second developing region 11b. At this time, the support arm extends vertically, and substrate 48 extends downward from first holder 70 toward developing region 11b. For this reason, after almost the entire substrate 48 passes through region 11b, holder 70 and support arm 68 cross region 11b.

Support arm 68 is then bent to the right, so that substrate 48 is conveyed to a position below first developing region 11a on which monomolecules 21 are developed, and is turned through 180°. Moving base 61a is then moved upward, thereby pulling up substrate 48 from trough 11 through first developing region 11a. At this time, monomolecular film 21 is attached to each substrate surface. During the upward movement, substrate 48 extends upward from holder 70 toward first developing region 11a. For this reason, after almost the entire substrate 48 passes through region 11a, holder 70 and support arm 68 cross region 11a. Pulled-up substrate 48 is transferred to second holder 72.

In the modification with the above arrangement, when a monomolecular film is attached to the substrate surface, the holder and the support arm pass through the monomolecular film after almost the entire substrate 48 passes through the monomolecular film. For this reason, the developed monomolecular film can be prevented from being adversely influenced by the holder and the support arm, and a good monomolecular film can be formed on the substrate surface. According to this modification, when substrate 48 is moved downward through second developing region 11b, the first holder and the support arm pass through the second developing region after almost the entire substrate passes through the developing region. For this reason, when monomolecules are also developed on the second developing region, a good monomolecular film can be formed on the substrate surface upon downward movement of substrate 48 without being adversely influenced by the first holder and the support arm. Therefore, two good monomolecular thin layers can be formed on the substrate surface by one upward/downward movement of support arm 68 without transferring the substrate between the first and second holders. In this case, another movable barrier 22 for compressing monomolecules developed on the second developing region must be arranged.

In the above modification, substrate 48 can be vertically moved while the substrate surface is inclined at a predetermined angle with respect to a developed monomolecular film. For this reason, a decrease in surface pressure of the monomolecular film, occurring when the monomolecular film is attached to the substrate, can be prevented. Thus, a monomolecular film having better quality can be formed on the substrate surface.

FIGS. 21 and 22 show support arm 68 having another multi-joint structure. According to this modification, each of a plurality of joint members 86 is rotatably coupled to an adjacent joint member by means of single pin 87. Pin 87 is eccentrically located with respect to the central axis of each joint member 86. A through hole (not shown) is formed in each joint member 86, and is separated from pin 87 by an 180° angular interval about the central axis of each joint member. Single wire 88 fixed to distal-end joint member 86a extends in the through holes and stationary rod 84, and is coupled to pulley 90 mounted on moving base 61a.

Support arm 68 with the above arrangement can turn substrate 48 held by first holder 70 through 180° by rotating pulley 90 by motor 91 mounted on moving base 61a, as is shown in FIG. 22. Therefore, in this modification, the same function and effect as in the above modification can be obtained.

Figure 23:
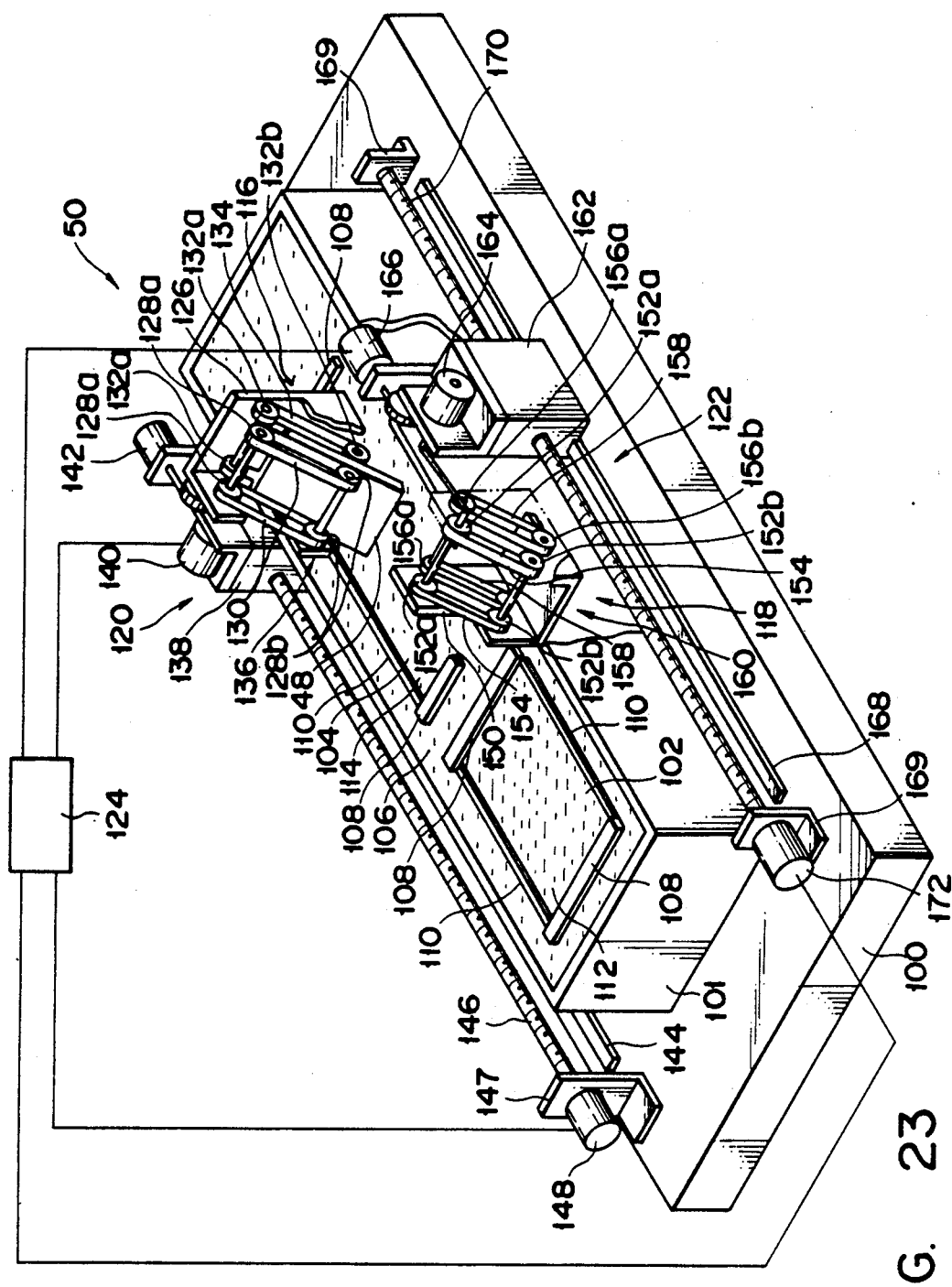

FIG. 23 shows an organic thin film forming apparatus according to a second embodiment of the present invention. This apparatus comprises base 100 and water tank 101 placed on the base and filled with water. The surface of the water is partitioned into two first developing regions 102 and 104, and second developing region 106 located therearound. More specifically, each first developing region is partitioned into a rectangular region by a pair of parallel movable barriers 108 and a pair of parallel stationary barriers 110. Monomolecules 112 are developed on region 102, and monomolecules 114 are developed on region 104, while no monomolecules are developed on second developing region 106. Each movable barrier 108 is moved on the water surface by a compression drive mechanism (not shown) having the same arrangement as in the first embodiment. Furthermore, the surface pressure of the monomolecules developed on each developing region is detected by a surface pressure detector (not shown).

The forming apparatus comprises substrate drive device 50 for dipping substrate 48 into or raising it out of the water in tank 101. Device 50 includes first lift mechanism 116 arranged above the water surface, second lift mechanism 118 arranged in the water of water bath 101, first horizontal moving mechanism 120 for horizontally moving first lift mechanism 116 above the water surface, and second horizontal moving mechanism 122 for horizontally moving second lift mechanism 118 in the water. The operations of these mechanisms are controlled by controller 124.

First lift mechanism 116 has support base 126. A pair of parallel endless belts 130 each looped between drive pulley 128a and driven pulley 128b and a pair of parallel endless belts 134 each looped between drive pulley 132a and driven pulley 132b are arranged on support base 126 to oppose each other. Drive pulleys 128a are coupled to each other through a shaft, and are separated from each other by a distance slightly smaller than the width of substrate 48. Similarly, driven pulleys 128b, drive pulleys 132a, and driven pulleys 132b are coupled through corresponding shafts, and are separated from each other by a distance slightly smaller than the width of substrate 48, respectively. Drive pulleys 128a and 132a, and driven pulleys 128b and 132b are separated by a distance substantially equal to the thickness of substrate 48, respectively. Therefore, two side edge portions of substrate 48 can be clamped between belts 130 and 134. Thus, first lift mechanism 116 also serves as first holding mechanism 136 for holding substrate 48. Drive pulleys 128a and 132a are connected to motor 140, mounted on moving base 138 of first horizontal moving mechanism 120, through the shafts. When drive pulleys 128a and 132a are rotated by motor 140, belts 130 and 134 can synchronously travel in the same direction. Therefore, substrate 48 clamped between belts 130 and 134 can be dipped into or pulled up from the water, from the above of water tank 101.

Support base 126 is rotatably supported by moving base 138, and can be rotated by motor 142 mounted on the moving base. For this reason, it is possible to change the inclination of substrate 48, clamped between belts 130 and 134, with respect to the water surface.

As described above, first horizontal moving mechanism 120 comprises moving base 138 supporting first lift mechanism 116. Base 138 is guided by guide rail 144 fixed on base 100, and is engaged with feed screw 146 attached to base 100 by a pair of support posts 147. Guide rail 144 and screw 146 extend parallel to each other in the longitudinal direction of tank 101. Motor 148 is attached to one support post 147, and is coupled to screw 146. When screw 146 is rotated by motor 148, moving base 138 can be moved along guide rail 144. Upon movement of moving base 138, first lift mechanism 116 is horizontally moved above the water surface.

Second lift mechanism 118 comprises support base 150 located in the water in tank 101. A pair of endless belts 154 each looped between drive pulley 152a and driven pulley 152b and a pairs of endless belts 158 each looped between drive pulley 156a and driven pulley 156b are arranged on support base 150 to oppose to each other in the same manner as in first lift mechanism 116. The opposite side edge portions of substrate 48 can be clamped between belts 154 and 158. Second lift mechanism 118 also serves as second holding mechanism 160. Drive pulleys 152a and 156a are connected to rotor 164 mounted on moving base 162 of second horizontal moving mechanism 122 (to be described later). When drive pulleys 152a and 156a are rotated by motor 164, belts 154 and 158 can synchronously travel in the same direction. Therefore, substrate 48 clamped between the belts can be further dipped into or pushed up from the water in tank 101 by mechanism 118.

Support base 150 is rotatably supported by moving base 162, and can be rotated by motor 166 mounted on the moving base. Therefore, the inclination of substrate 48, clamped between belts 154 and 158, with respect to the water surface can be adjusted.

As described above, second horizontal moving mechanism 122 comprises moving base 162 supporting second lift mechanism 118. The moving base is guided by guide rail 168 fixed on base 100, and is engaged with feed screw 170 attached to the base through a pair of support posts 169. Guide rail 168 and screw 170 extend to be parallel to each other in the longitudinal direction of tank 101. Motor 172 is attached to one support post 169, and is coupled to screw 170. When screw 170 is rotated by motor 172, moving base 162 can be moved along guide rail 168. Therefore, second lift mechanism 118 can be horizontally moved in the water in tank 101.

The process of forming a monomolecular film on the surface of substrate 48 using the forming apparatus with the above arrangement will be explained.

As is shown in FIG. 24A, after substrate 48 is held between belts 130 and 134 of first lift mechanism 116, mechanism 116 is moved to a position above first developing region 102 by first horizontal moving mechanism 120. Similarly, second lift mechanism 118 is moved to a position below first developing region 102 by second horizontal moving mechanism 122 to oppose mechanism 116. In this case, the angles of support bases 126 and 150 are adjusted so that belts 130 and 134 and belts 154 and 160 are aligned on a line. In this state, the belts of mechanisms 116 and 118 are driven in the same direction, i.e., a direction for moving substrate 48 downward. Thus, substrate 48 is driven by belts 130 and 134 of mechanism 116, and dipped into tank 101 through developing region 102. When substrate 48 is dipped halfway into the water, the lower end portion of substrate 48 is clamped between belts 154 and 158 of second lift mechanism 118, so that the substrate is transferred from the first lift mechanism to the second lift mechanism. Thereafter, substrate 48 is further moved downward by belts 154 and 158 of mechanism 118. When substrate 48 is completely dipped, driving of the belts is stopped. In this manner, when substrate 48 passes through first developing region 102, as is shown in FIG. 24B, developed monomolecule film 112 is attached to each substrate surface.

Thereafter, as is shown in FIG. 25A, second lift mechanism 118 holding the substrate is conveyed in the water to a position below first developing region 104 by second horizontal moving mechanism 122. Similarly, first lift mechanism 116 is conveyed to a position above region 104 by first horizontal moving mechanism 120 so as to oppose mechanism 118. The support bases of the lift mechanisms are rotated so that the moving direction of substrate 48 is changed through 90° from the state illustrated in FIG. 24A. In this state, the belts of mechanisms 116 and 118 are driven in the same direction, i.e., in a direction for moving substrate 48 upward. Substrate 48 is thus driven by belts 154 and 158 of mechanism 118, and is pulled up from tank 101 through developing region 104. When substrate 48 is lifted about halfway from the water surface, the upper and portion of the substrate is clamped between belts 130 and 134 of mechanism 116, so that the substrate is transferred from the second lift mechanism to the first lift mechanism. Thereafter, substrate 48 is further moved upward by belts 130 and 134 of mechanism 116. When substrate 48 is completely pulled up from the water, driving of the belts is stopped. In this manner, when substrate 48 passes through first developing region 104, developed monomolecular film 114 is attached to each substrate surface.

With the above process, a Y-type built-up film consisting of different monomolecules can be formed on each substrate surface, as is shown in FIG. 26.

Various hetero structure films can be formed by combining the above-mentioned substrate moving operations, and adding the process of moving the substrate upward/downward through second developing region 106.

According to the second embodiment with the above arrangement, when a substrate is moved through a developing region on which monomolecules are developed, the substrate is transferred between the first and second lift mechanisms which are located above and below the developed monomolecular film. For this reason, the lift mechanisms for holding the substrate do not cross the developed molecules, and hence, do not adversely influence the developed monomolecules. Therefore, a good monomolecular film can be formed on each substrate surface as in the first embodiment.

In the second embodiment, the number of first developing regions, on which monomolecules are to be developed, is not limited to two but may be easily increased as needed. By adjusting the angles of the support bases of the lift mechanisms, the substrate may clamp only one side edge portion of a substrate by using a pair of belts.

FIG. 27 shows an organic thin film forming apparatus according to a third embodiment of the present invention. This apparatus comprises base 100 and though 101 placed on the base and storing water. The surface of water is partitioned into two first developing regions 102 and 104 and second developing region 106 located therearound. More specifically, each first developing region is partitioned into a rectangular shape by a pair of parallel movable barriers 108 and a pair of parallel stationary barriers 110. Monomolecules 112 are developed on region 102 and monomolecules 114 are developed on region 104, while no monomolecules are developed on second developing region 106. Each movable barrier 108 is moved on the water surface by a compression drive mechanism (not shown) having the same arrangement as that in the first embodiment. Furthermore, the surface pressure of monomolecules developed on the developing region is detected by a surface pressure detector (not shown).

The forming apparatus comprises substrate drive device 50 for dipping substrate 48 into or pulling it up from the water. Device 50 comprises holding mechanism 54 for holding substrate 48, lift mechanism 56 for moving the substrate held by the holding mechanism with respect to though 101, and horizontal moving mechanism 58 for conveying the substrate held by the holding mechanism in a direction parallel to the water surface. The operations of these mechanisms are controlled by controller 124.

As is shown in FIGS. 27 and 28, holding mechanism 54 comprises support plate 174 supported by moving base 61 of lift mechanism 56 (to be described later). Plate 174 is constituted by first portion 174a rotatably supported by moving base 61, and second portion 174b rotatably connected to the first portion through a pair of hinges 175. Solenoid 178 is arranged on first portion 174a, and a plunger cooperating with the solenoid is connected to coupling projection 180 on second portion 174b through connecting rod 179. When solenoid 178 is driven, second portion 174b can be rotated with respect to first portion 174a.

A pair of first holding pawls 176 serving as a first holder for holding substrate 48 are pivotally attached to first portion 174a. The distal end portion of each holding pawl 176 sufficiently extends downward to a position below the lower end of support plate 174. First air cylinder 177 is connected between pawls 176. The pawls are pivoted by the air cylinder in approaching and separating directions. When pawls 176 are opened/closed by air cylinder 177, substrate 48 can be held between the distal end portions of the pawls. A pair of second holding pawls 182 serving as a second holder for holding substrate 48 are pivotally attached to second portion 174b. Pawls 182 are located inside first holding pawls 176, and their distal end portions extend downward to a position below the lower end of support plate 174 and are located above the first holding pawls. Second air cylinder 183 is connected between pawls 182. Pawls 182 are pivoted by the second air cylinder in the approaching and separating directions. When holding pawls 182 are opened/closed by air cylinder 183, substrate 48 can be held between the distal ends of pawls 182.

Lift mechanism 56 comprises moving base 61 supporting holding mechanism 54. Base 61 is engaged with feed screw 184 which extends perpendicular to the surface of the water in trough 101. Feed screw 184 is coupled to motor 78 mounted on support base 185 of horizontal moving mechanism 58 (to be described later). When screw 184 is rotated by motor 78, moving base 61 can be vertically moved.

Horizontal moving mechanism 58 has a pair of support posts 186 standing upright at the two end portions of base 100, and feed screw 187 extends between these posts. Feed screw 187 horizontally extends above trough 101, and is engaged with support base 185. Motor 188 is attached to one support post 186, and is connected to feed screw 187. When feed screw 187 is rotated by motor 188, support base 185 supporting holding mechanism 54 and lift mechanism 56 can be horizontally moved. As a result, substrate 48 held by the holding mechanism can be conveyed between first and second developing regions 102, 104, and 106.

The process of forming a monomolecular film on the surface of substrate 48 using the forming apparatus with the above arrangement will be described.

As is shown in FIG. 29A, after substrate 48 is held by short second holding pawls 182, horizontal moving mechanism 58 is driven so that substrate 48 is located above first developing region 102. In this case, first and second portions 174a and 174b of support plate 174 are located in a common plane, and are set at a predetermined angle with respect to region 102. First holding pawls 176 are open.

As is shown in FIG. 29B, substrate 48 is moved downward through region 102 by lift mechanism 56 and is completely dipped into the water. At this time, first holding pawls 176 are dipped into the water through second developing region 106 on which no monomolecules are developed. Thus, monomolecular film 112 developed on region 102 can be attached to each surface of substrate 48.

As is shown in FIG. 29C, then, first holding pawls 176 are closed so that the lower end portion of substrate 48 is held by pawls 176. Second holding pawls 182 are then opened to release holding of substrate 48 by holding pawls 182. Substrate 48 is thus transferred from second holding pawls 182 to first holding pawls 176.

As is shown in FIG. 29D, second portion 174b of support plate 174 is pivoted upward, so that second holding pawls 182 are pulled up from trough 101. In this state, substrate 48 is conveyed in the water by horizontal moving mechanism 58 to a position below first developing region 104.

As is shown in FIG. 29E, the substrate is moved upward by lift mechanism 56 through first developing region 104. When the upper half of substrate 48 is pulled up from developing region 104, second portion 174b of support plate 174 is pivoted to its initial position, and second holding pawls 182 are closed to hold the upper end portion of the substrate. Thereafter, first holding pawls 176 are opened to release holding of substrate 48. Thus, the substrate is transferred from the first holding pawls to the second holding pawls. Then, substrate 48 is further pulled up until entire substrate 48 passes through developing region 104. At this time, the first holding pawls pass through second developing region 106 on which no monomolecules are developed. Thus, monomolecular film 114 is attached to each substrate surface.

With the above process, a Y-type built-up film having two different monomolecular film layers can be formed o each substrate surface.

In the forming apparatus with the above arrangement, when substrate 48 is moved upward and downward through a developing region on which monomolecules are developed, the second holding pawls holding the substrate pass through the developing region after almost the entire substrate passes through the developing region, and the first holding pawls do not pass through the developing region at all. Therefore, a monomolecular film before being attached to the substrate is not adversely influenced by the holding pawls, and a good monomolecular film can be formed on each substrate surface.

In the third embodiment, after dipping substrate 48 into the water through first developing region 102, the substrate may be pulled up from the water through region 102. In this case, first substrate 48 held at its upper end portion by second pawls 182 is moved downward through region 12 until the distal ends of pawls 182 reach a position just above region 102. At this time, first pawls 176 pass through second developing region 106. Thereafter, pawls 176 are closed to hold the lower end portion of substrate and, then, pawls 182 are opened, thus transferring substrate 48 from the second pawls to the first pawls. Second portion 174b is pivoted upward to move pawls 182 away from region 102. Subsequently, substrate 48 held by first pawls 176 is further moved downward and completely dipped into the water, thereby adhering monomolecular film 112 to each substrate surface. Thereafter, the pulling up operation as is shown in FIGS. 29D and 29E is performed through first developing region 102. Thus, during the pulling up operation, monomolecular film 112 is attached to each substrate surface.

In the third embodiment, holding mechanism 54 may be arranged as shown in FIGS. 30 and 31.

According to this embodiment, holding mechanism 54 comprises first cylinder 190 held by clamp 189 fixed to support plate 174. The cylinder extends perpendicular to the surface of the water in trough 101. Cylinder 190 has first and second holders 72 and 70 for holding substrate 48. First holder 72 includes substantially V-shaped leaf spring 191 arranged in cylinder 190, a pair of pins 192a fixed to one end of the leaf spring, and pin 192b fixed to the other end of the leaf spring and extending parallel to pins 192a. Pins 192a and 192b extend outside cylinder through circumferential elongated holes 193 formed in cylinder 190. Pins 192a and 192b are normally biased by leaf spring 191 to come closer to each other, i.e., to be able to clamp substrate 48 therebetween. Second holder 70 has leaf spring 194, and a pair of pins 195a and 195b, in the same manner as in first holder 72. These pins extend outside through elongated holes 196 formed in cylinder 190. First and second holders 72 and 70 are separated from each other by a distance almost equal to the length of substrate 48.

Second cylinder 197 is coaxially inserted in first cylinder 190, and its upper end portion is rotatably supported by support post 198 standing upright on support plate 174. Gear 200 is fixed to the outer surface of the upper end portion of cylinder 197. Motor 201 is attached to support plate 174, and gear 202 fixed to the rotational shaft of the motor is meshed with gear 200. Flat plate like rotary member 204 is fixed to the lower end of second cylinder 197, and is located inside leaf spring 191 of first holder 72 (in FIG. 31, rotary member 204 is illustrated at a position offset from leaf spring 191 for the purpose of illustrative convenience). When cylinder 197 and rotary member 204 are rotated by motor 201, leaf spring 191 is opened by the rotary member against its biasing force, and as a result, pins 192a and 192b can be opened.

Rotary shaft 206 is coaxially inserted in second cylinder 197, and its upper end portion is rotatably supported by support post 207 standing upright on support plate 174. Gear 208 is fixed to the outer surface of the upper end portion of shaft 206. Motor 209 is attached to support plate 174, and gear 210 fixed to the rotational shaft of this motor is meshed with gear 208. The lower end of shaft 206 extends below the lower end of second cylinder 197. Flat rotary member 212 is fixed to the lower end of shaft 206 and is located inside leaf spring 194 of second holder 74. When shaft 206 and rotary member 212 are rotated by motor 209, leaf spring 194 is opened by the rotary member against its biasing force, and as a result, pins 195a and 195b can be opened. FIGS. 30 and 31 show a state wherein pins 195a and 195b are opened.

The process of forming a monomolecular film on a substrate surface using the forming apparatus having holding mechanism 54 with the above arrangement will now be described.

Figure 32A:
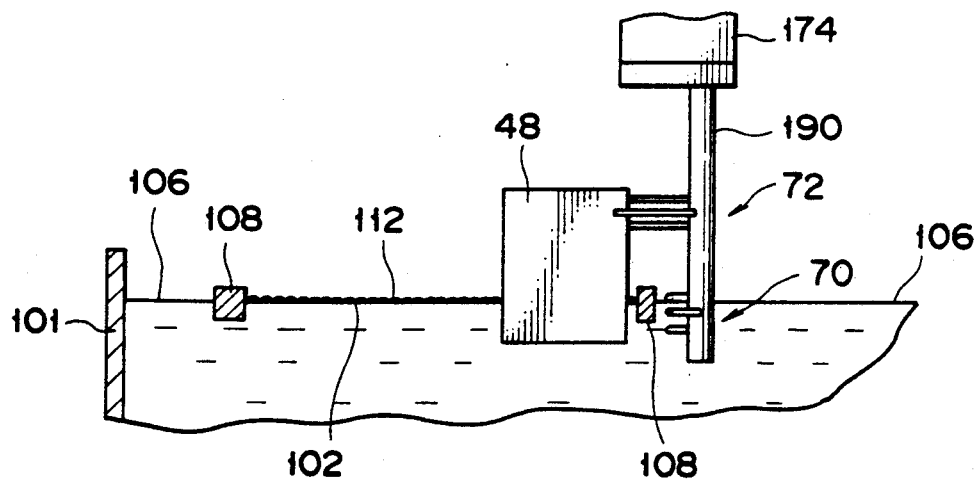

As is shown in FIG. 32A, the side edge of the upper end portion of substrate 48 is held by first holder 72, and the entire holding mechanism is moved so that substrate 48 is located above first developing region 102 and first cylinder 190 of holding mechanism 54 is located above second developing region 106 on which no monomolecules are developed. In this state, substrate 48 is moved downward by the lift mechanism through first developing region 102, and first cylinder 190 is moved downward through second developing region 106. In this case, pins 195a and 195b of second holder 70 are opened so as not to contact movable barrier 108.

Figure 32B:
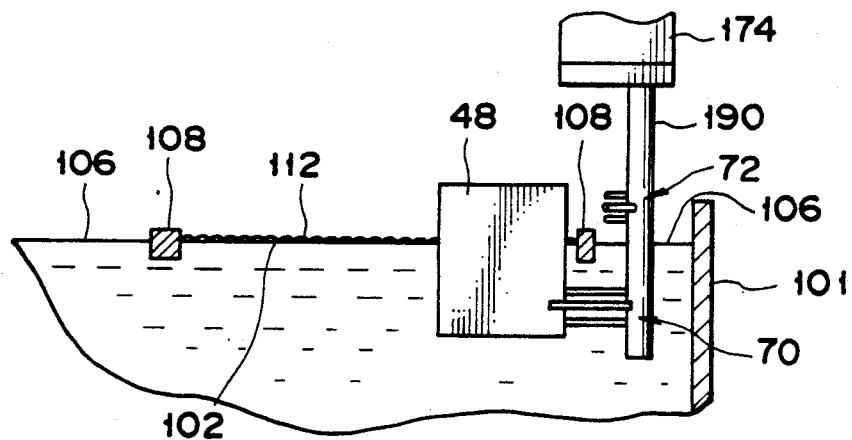

As is shown in FIG. 32B, in a state wherein the lower end portion of substrate 48 passes through developing region 102 and movable barrier 108 is located between first and second holders 72 and 70, pins 195a and 195b of holder 70 are closed to hold the side edge of the lower end portion of substrate 48, and pins 192a and 192b of holder 72 are opened to release the substrate. Thus, substrate 48 is transferred from first holder 72 to second holder 70. Thereafter, substrate 48 is further moved downward through first developing region 102 until substrate 48 is completely dipped into the water. In this case, since pins 192a and 192b of first holder 72 are opened, they can be moved downward without abutting against movable barrier 108. With the above process, monomolecular film 112 developed on region 102 can be attached to each surface of substrate 48.

Substrate 48 is pulled up through first developing region 102 in the process opposite to the downward movement process described above.

Therefore, a two-layered built-up film can be formed on each substrate surface.

In the forming apparatus with the above arrangement, when substrate 48 is moved downward and upward through the first developing region on which monomolecules are developed, first and second holders 72 and 70 holding the substrate do not pass through the first developing region. Therefore, a developed monomolecular film can be prevented from being adversely influenced by the holders, and a good monomolecular film can be formed on the substrate surface.

Figure 34:
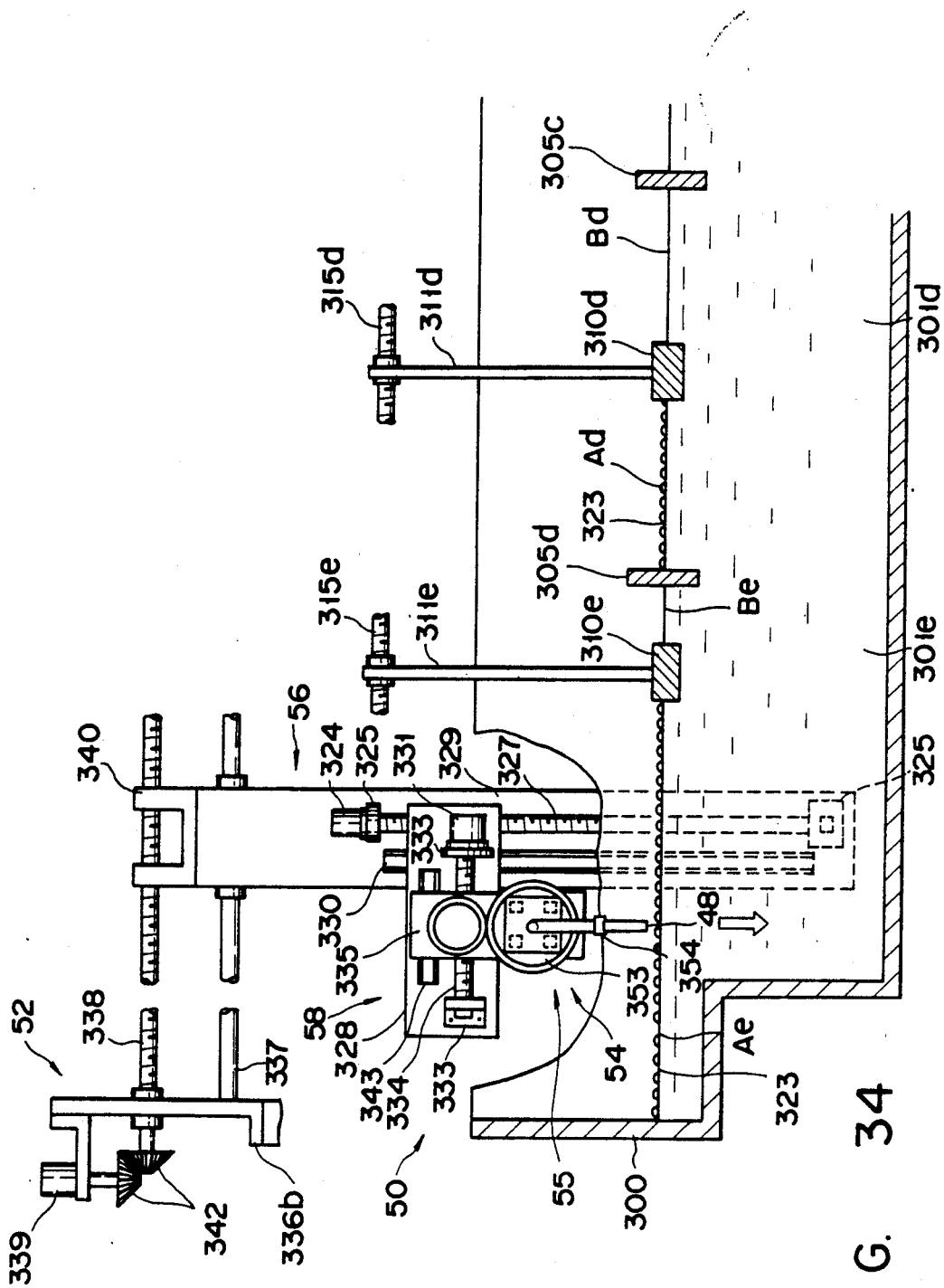

FIG. 33 shows a hetero structure film forming apparatus according to a fifth embodiment of the present invention. As is shown in FIGS. 33 and 34, this apparatus comprises, as developing means 10, rectangular trough 300 storing water therein. The water surface of trough 300 is partitioned into five series water surface sections 301a to 301e by four partition plates 305a to 305d in order to develop five kinds of amphiphilic organic molecules on the water surface. Compression drive mechanisms 302a to 302e for converting the monomolecular films developed on the corresponding water surface sections into condensed films at a predetermined surface pressure and five surface pressure detectors 309 for detecting surface pressures of developed monomolecular films are independently arranged in correspondence with the water surface sections. FIG. 33 illustrates only detector 309 corresponding to section 301a. In practice, the detectors having the same arrangement as detector 309 are provided in correspondence with the remaining water surface sections. As the detector, a Wilhelmy type detector using an electronic balance is employed.

Drive mechanism 302e corresponding to section 301e will be explained. As shown in FIG. 33 and 34, this drive mechanism comprises movable barrier 310e, made of Teflon. Barrier 310e is formed into a rod shape, and extends over the widthwise direction of trough 300, i.e., to be parallel to partition plate 305d. The water surface in section 301e is partitioned by barrier 301e into first developing region Ae on which monomolecules 323 are developed, and second developing region Be on which no monomolecules are developed. One end of barrier 301e is fixed to support base 312e through coupling rod 311e. Support base 312e is slidably placed on guide rail 314e which is mounted on base 313e fixed to base 306, and is engaged with feed screw 315e. Two ends of feed screw 315e are rotatably supported by a pair of support posts 316e standing upright on base 313e. Guide rail 314e and feed screw 315e extend parallel to each other in the longitudinal direction of trough 300. The driving force of motor 318e supported on support post 316e is transmitted to feed screw 315e. When feed screw 315e is rotated by motor 318e, barrier 310e moves along the water surface and compresses organic molecules floating on first developing region Ae to the left, thus forming a condensed monomolecular film having a predetermined surface pressure.

Other compression drive mechanisms corresponding to water surface sections 301a to 301d have the same arrangement as described above.

The forming apparatus comprises substrate drive device 50 for dipping substrate 48, as a work on which a film is formed, into or pulling up it from the water in trough 300, and device 52 for transporting device 50 between sections 301a to 301e. Devices 50 and 52, the compression drive mechanisms, and the surface pressure detectors are connected to controller 5, and their operations are controlled by controller 5. As is shown in detail in FIG. 34, device 50 has holding mechanism 54 for holding a substrate, rotating mechanism 55 for rotating the substrate, lift mechanism 56 for vertically moving the substrate, and horizontal moving mechanism 58 for horizontally moving the substrate in the longitudinal direction of trough 300.

As is shown in FIG. 33, transporting device 52 comprises a pair of columns 336a and 336b standing upright on the two end portions of base 306. A pair of guide rails 337 are fixed between the upper ends of the columns. Guide rails 337 horizontally extend above trough 300 to be parallel to each other. Moving plate 340 is slidably placed on guide rails 337. Substrate drive device 50 is suspended from moving plate 340. Moving plate 340 is engaged with feed screw 338 which extends parallel to guide rails 337. The two end portions of feed screw 338 are supported at the two ends of the guide rails through support plates 341. Motor 339 is fixed on one support plate 341. Feed screw 338 is rotated by motor 339 through gear 342. When feed screw 338 is driven, device 50 can be desirably moved between water surface sections 301a to 301e along guide rails 337.

Substrate drive device 50 will be described in detail with reference to FIGS. 34 and 35.

Lift mechanism 56 of device 50 comprises support rod 329 extending downward from plate 340 of device 52 to be perpendicular to the water surface of trough 300, and moving table 328 extending horizontally. Table 328 is slidably held by guide rail 330 fixed on support rod 329, and is engaged with feed screw 327 mounted on the support rod through a pair of support posts 325. Guide rail 330 and feed screw 327 extend to be parallel to each other and to be perpendicular to the water surface of trough 300. Motor 324 is fixed to one support post 325, and the driving force of the motor is transmitted to feed screw 327. When feed screw 327 is rotated, moving table 328 is vertically moved along guide rail 330.

Horizontal moving mechanism 58 has moving table 335. Table 335 is guided by guide rail 343 fixed to table 328, and is engaged with feed screw 334 mounted on table 328 through a pair of support posts 333. Guide rail 343 and screw 334 extend parallel to each other in the longitudinal direction of trough 300. Motor 331 is mounted on one support post 333, and is coupled to one end of feed screw 334. When feed screw 334 is rotated by motor 331, moving table 335 is horizontally moved.

Rotating mechanism 55 has first rotor 349 rotatably supported by table 335 through rotational shaft 347. Shaft 347 extends perpendicular to the side wall of trough 300, and the distal end face of rotor 349 is in sliding contact with the outer surface of the trough. Four magnets 348 are embedded in rotor 349 at equal angular intervals around rotational shaft 347. Gear 346 is fixed to shaft 347, and is meshed with gear 345. Gear 345 is fixed to the drive shaft of motor 344 mounted on moving table 335. Therefore, when motor 344 is driven, rotor 349 can be rotated about shaft 347.

Holding mechanism 54 comprises disk-shaped second rotor 353 arranged inside trough 300. Four attraction members 352 of a magnetic material, e.g., SS41, are embedded in rotor 353. Attraction members 352 are separated at equal angular intervals about the central axis of rotor 353 so as to oppose magnets 348 in first rotor 349, respectively. When attraction members 352 are attracted by magnets 348, second rotor 353 is held coaxially with first rotor 349 while being in contact with the inner surface of the side wall of trough 300. Therefore, when first rotor 349 is rotated or moved along the outer side wall surface of trough 300, second rotor 353 can be rotated and moved in synchronism therewith. Note that the attraction members may be formed of magnets (electromagnets or permanent magnets) in order to increase an attraction force between attraction members 352 and magnets 348.

Holding mechanism 54 includes support arm 356 extending from second rotor 353, and holder 354 attached to the distal end of the support arm and holding substrate 48. Support arm 356 has horizontal portion 356a coaxially extending from rotor 353, and vertical portion 356b extending from the extended end of portion 356a to be perpendicular thereto. The length of vertical portion 356b is larger than the radius of second rotor 353.

According to substrate drive device 50 with the above arrangement, when at least one of lift mechanism 56, horizontal moving mechanism 58, and rotating mechanism 55, which are arranged outside trough 300, is driven, magnets 348 embedded in first rotor 349 are moved, and second rotor 535, in which attraction members 352 attracted by the magnets are embedded, is moved by the attraction forces of the magnets. Thus, substrate 48 held by holder 354 is moved.

A basic film forming process in the organic thin film forming apparatus with the above arrangement will now be described.

Figure 36:
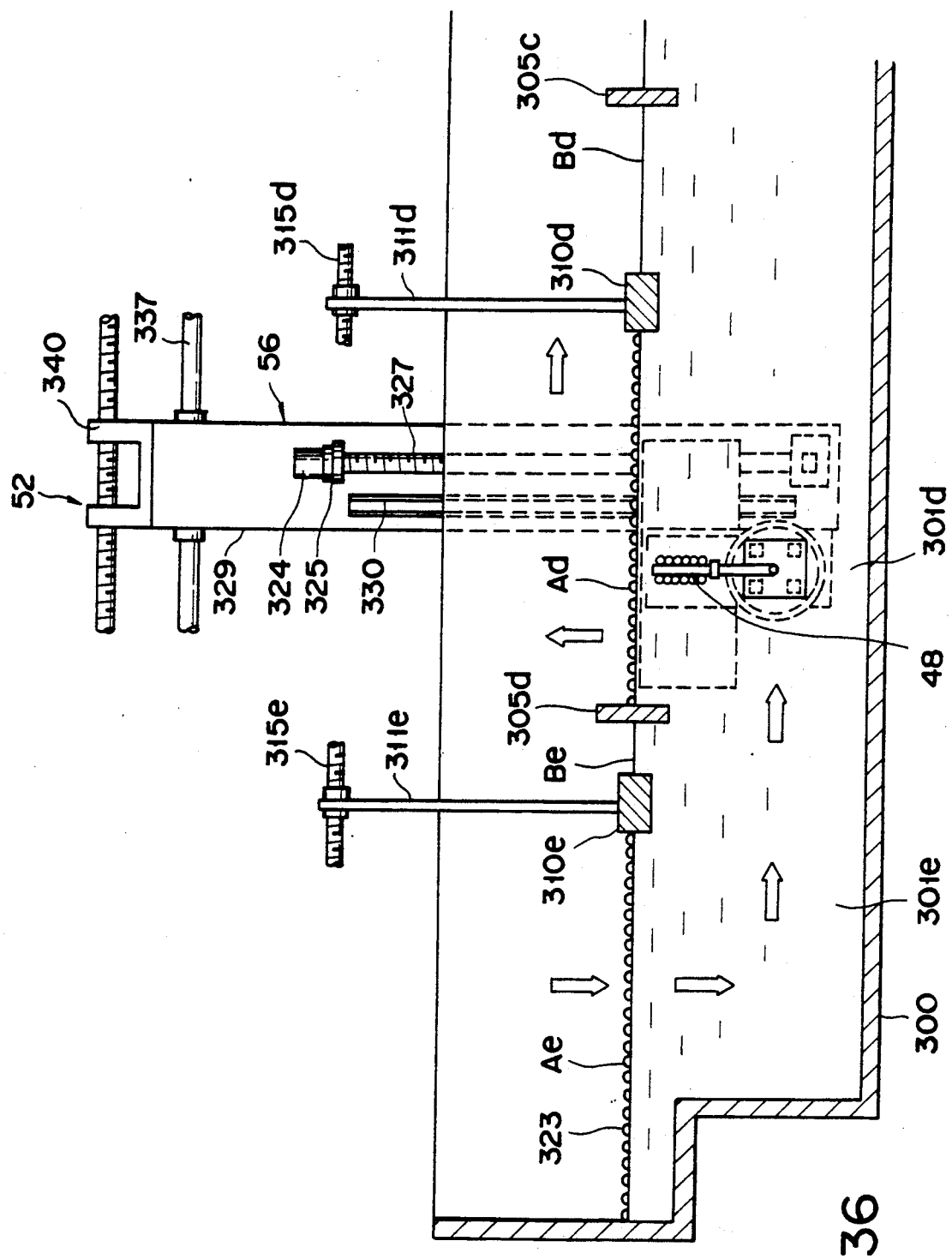

When different monomolecules are to be built up on the surface of substrate 48, substrate 48 is moved from a state illustrated in FIG. 34 to a state illustrated in FIG. 36. For the purpose of easy understanding, FIGS. 37A to 37F schematically show the forming steps.

Figure 37A:
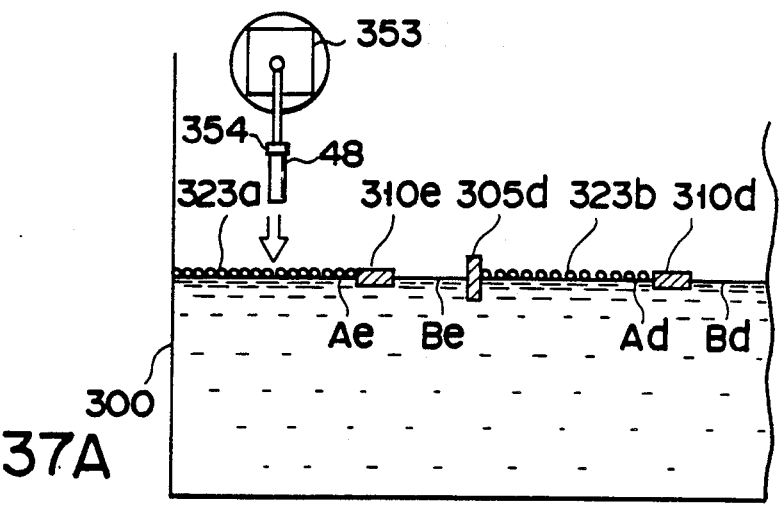
Figure 37B:
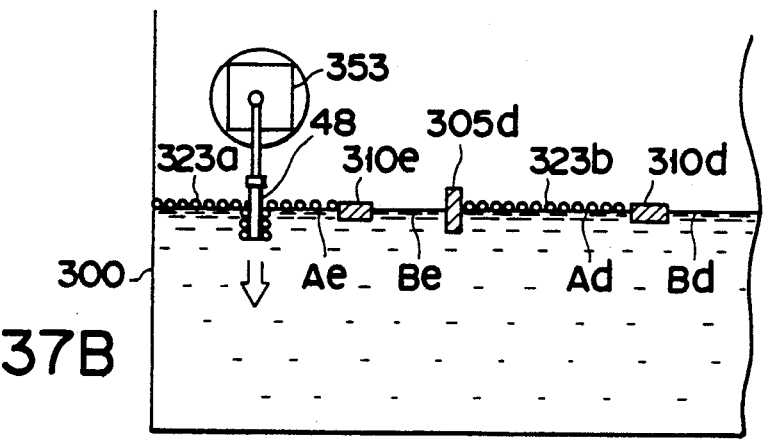

As is shown in FIGS. 34 and 37A, second rotor 353 is rotated so that substrate 48 held by holder 354 is directed downward from the holder. As is shown in FIG. 37B, substrate 48 is dipped into the water in trough 300 at a predetermined angle (in FIG. 37A, substrate 48 is dipped in a direction perpendicular to the water surface, but may be dipped while being inclined at 90°, 45°, or an arbitrary angle) through first developing region Ae on which monomolecules 323a are developed. This downward movement is performed by driving lift mechanism 56. Thus, monomolecular film 323a is attached to each surface of substrate 48.

Figure 37C:
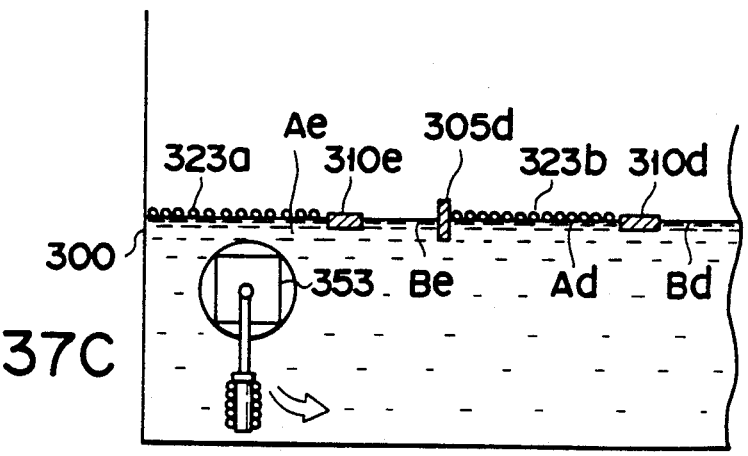
Figure 37D:
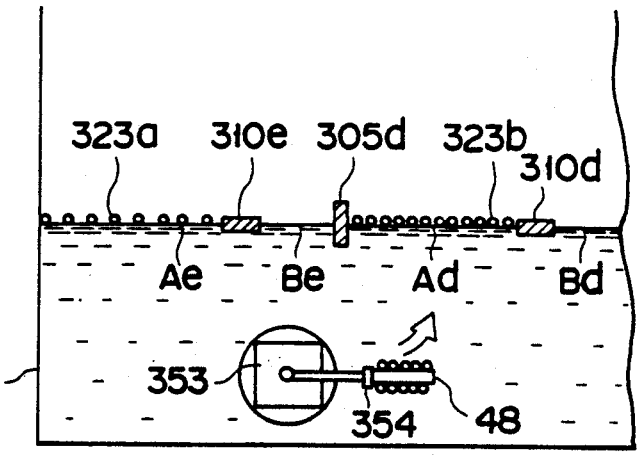
Figure 37E:
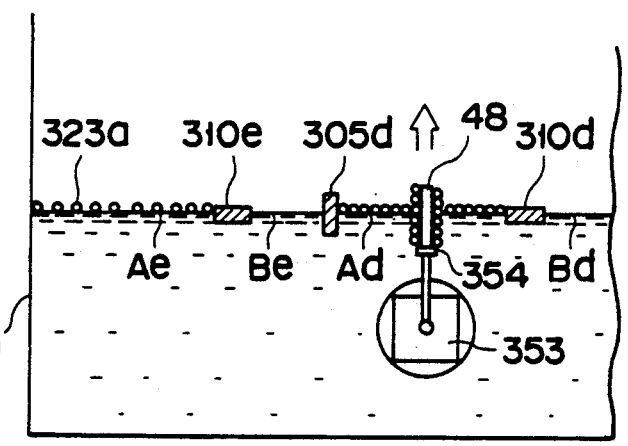

Then, as is shown in FIG. 37C, while substrate 48 and second rotor 353 are dipped in trough 300 or while it is in the process of being dipped into the trough bath, second rotor 353 is rotated so that substrate 48 is directed upward toward the water surface, as is shown in FIGS. 37D and 37E. Thereafter, substrate 48 is conveyed by transporting device 52 to a position below first developing region Ad on which another monomolecules 323b are developed, and is then moved upward through developing region Ad. Either the operation of transporting substrate 48 from region Ae to region Ad or the operation for rotating the substrate may be performed first, or these operations may be performed at the same time.

Figure 37F:
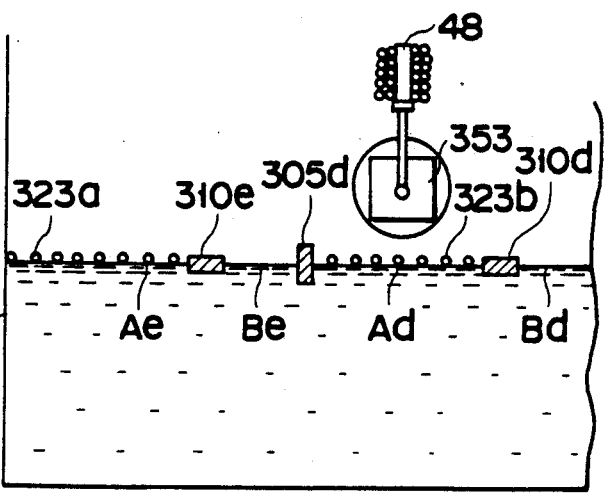

During upward movement of substrate 48, the angle of the substrate to the water surface can be adjusted to a predetermined value. As is shown in FIG. 37F, when substrate 48 is completely pulled up from the water, monomolecular film 323a and monomolecular film 323b different from film 323a are built up on each surface of substrate 48.

According to the forming apparatus with the above arrangement, substrate 48 held by holder 354 can be rotated by rotating mechanism 55 in a desired direction and through a desired angle at positions above and below the water surface. When substrate 48 is to be moved downward through a developing region on which monomolecules are developed, it can be located between the developing region and holder 354. Similarly, when substrate 48 is to be moved upward through a developing region on which monomolecules are developed, it can be located between the developing region and holder 354. Therefore, when substrate 48 is moved upward or downward through the developing region on which monomolecules are developed, substrate 48 can pass through the monomolecule developing region prior to second rotor 353 and holder 354. As a result, the monomolecular film developed on the developing region can be prevented from being adversely influenced by the second rotor, the support arm, the holder, and the like, and a high-quality monomolecular film can be attached to each substrate surface.

In the forming apparatus described above, when only one monomolecular film layer is formed on each surface of substrate 48, substrate 48 is dipped into the water through first developing region Ae on which monomolecules 323a are developed, as is shown in FIGS. 37A to 37C. Subsequently, substrate 48 is moved to a position below second developing region Be on which no molecules are developed, and is pulled up from the water through region Be.

In contrast to this, after substrate 48 is dipped into the water through second developing region Be, it can be pulled up from the water through first developing region Ae.

Note that when the substrate is moved upward or downward through second developing region Be, the second rotor may cross region Be prior to the substrate, and the substrate may be directed in any direction.

Various hetero structure films can be formed on the substrate surface by combining the basic film forming process, and the process of moving the substrate upward or downward through the second developing region on which no monomolecules are developed.

Figure 38:
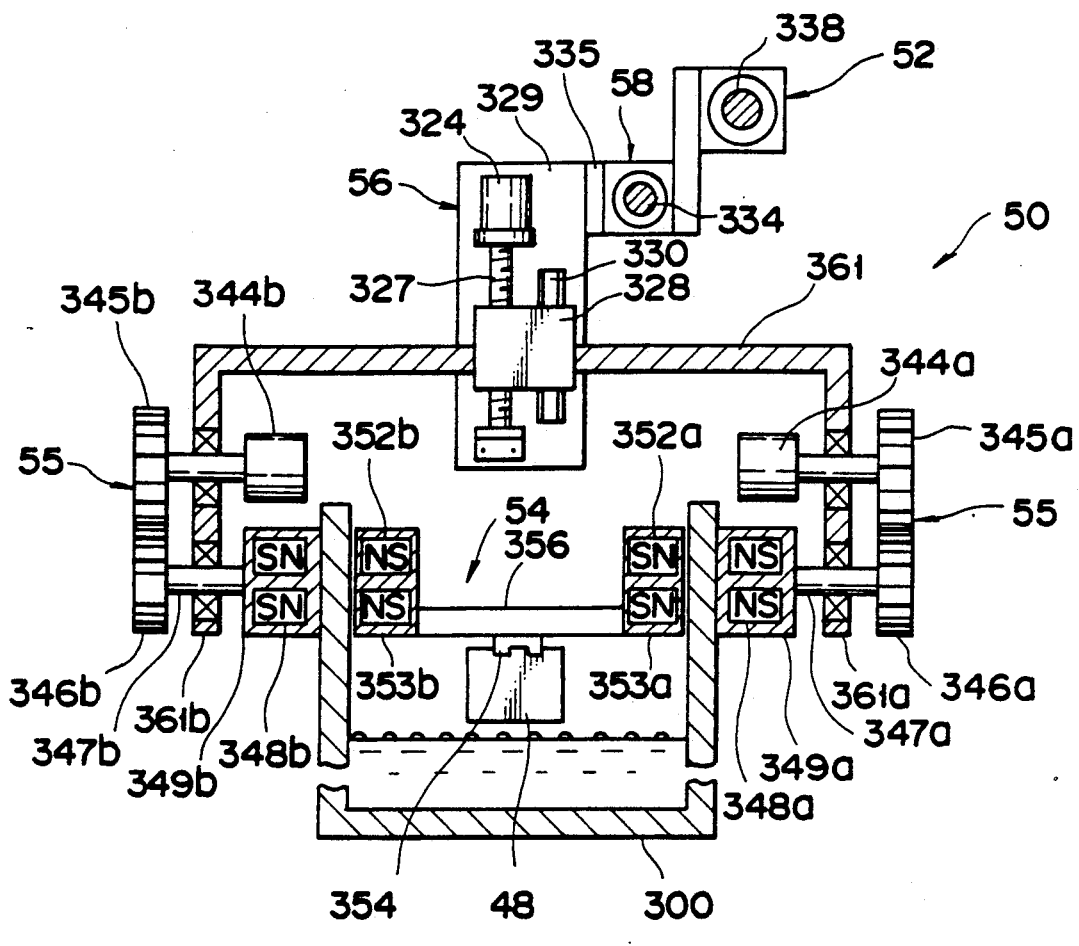
FIG. 38 is a partially cutaway side view showing a first modification of the substrate drive device.

FIG. 38 shows a modification of substrate drive device 50. In this modification, a substrate is movably supported by utilizing a repulsion force of magnets.

According to device 50 shown in FIG. 38, rotating mechanism 55 comprises support plate 361 fixed to moving table 328 of lift mechanism 56, and a pair of first rotors 348a and 348b mounted on the support plate. Support plate 361 has a horizontal portion horizontally extending from moving table 328 and a pair of vertical portions 361a and 361b vertically extending downward from the two ends of the horizontal portion. Vertical portions 361a and 361b are located outside the two opposing side walls of trough 300 to oppose each other. Rotor 349a incorporating four magnets 348a is rotatably supported on vertical portion 361a through rotational shaft 347a, and its distal end face is in sliding contact with the outer side wall surface of the trough. Rotor 349a is rotated by motor 344a mounted on vertical portion 361a through gears 345a and 346a. Rotor 349b incorporating four magnets 348b is rotatably supported on vertical portion 361b through rotational shaft 347b, and its distal end face is in sliding contact with the outer side wall surface of the trough. Rotor 349b is rotated by motor 344b mounted on vertical portion 361b through gears 345b and 346b.

Holding mechanism 54 comprises a pair of second rotors 353a and 353b, and horizontal coupling rod 356 coupling these rotors. Holder 354 for holding substrate 348 is fixed to coupling rod 356. Rotor 353a is located inside the side wall of trough 300 to oppose first rotor 349a, and incorporates four magnets 352a arranged to cause repulsion force against magnets 348a in first rotor 349a. Similarly, rotor 353b is located inside the side wall of trough 300 to oppose first rotor 340b, and incorporates four magnets 352b arranged to cause repulsion force against magnets 348b in rotor 349b. Therefore, holding mechanism 54 is held inside trough 300 while being suspended. Holding mechanism 54 is moved and rotated to follow movement and rotation of first rotors 349a and 349b.

When holding mechanism 54 is arranged so that a gap is formed between second rotors 353a and 353b and the inner side wall surfaces of trough 300, respectively, substrate 48 can be freely moved without being influenced by frictional force between the holding mechanism and the trough.

In the forming apparatus having device 50 with the above arrangement, a high-quality monomolecular film can be formed on the substrate surface as in the fifth embodiment.

FIGS. 39 to 41B show modifications of trough 300 in the fifth embodiment wherein the substrate is held utilizing the attraction force of the magnets.

Figure 39:
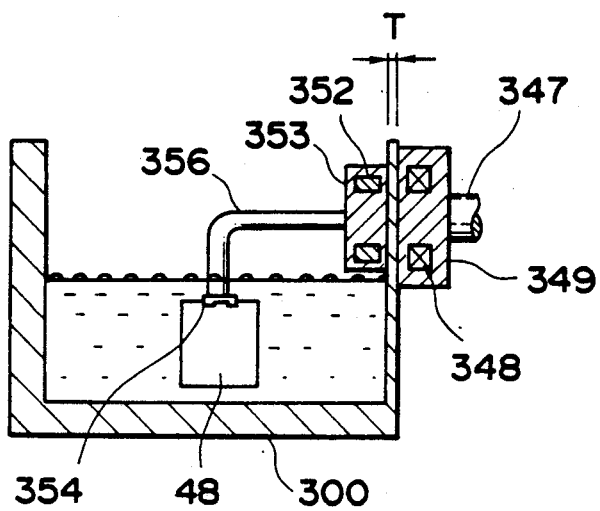
FIG. 39 is a sectional view showing a modification of a trough.

According to the modification shown in FIG. 39, thickness T of a portion of trough 300, in particular, of the side wall of the trough, which is located within the moving range of first rotor 349, is decreased so as to allow easy passage of the magnetic force of magnets 348 and to enhance the attraction force. Thickness T is set to be about 1/10 the wall thickness of the remaining portion of trough 300. Alternatively, the thickness of all the walls of trough 300 may be decreased. However, in this case, the thickness must be set so that deformation of trough 300 due to water pressure in the trough does not influence formation of a hetero film.

Figure 40:
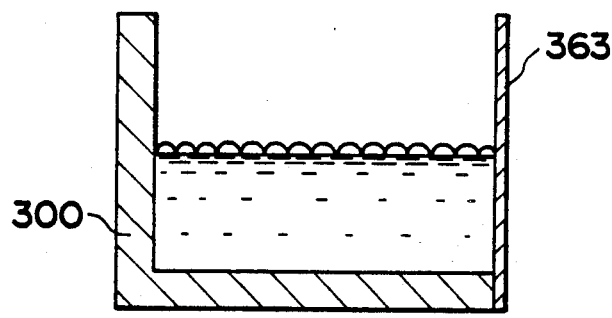
FIG. 40 is a sectional view showing a second modification of the trough.

FIG. 40 shows a modification wherein a portion (moving range of first rotor 349) of trough is formed of non-magnetic material 363 in order to realize smooth movement of rotors 349 and 353. The entire trough may be formed of non-magnetic material 363 depending on the power and arrangement of magnets 348. In this case, non-magnetic material 363 must be selected so as not to be dissolved depending on the type of liquid or molecules to be developed.

Figures 41A, 41B:
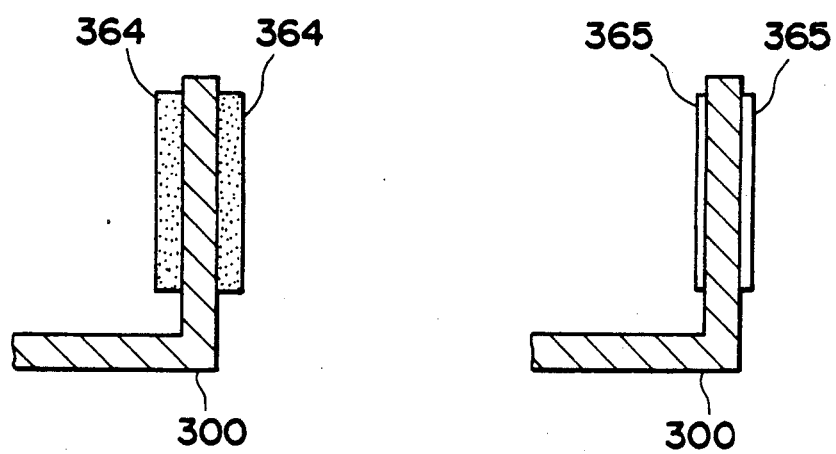
FIGS. 41A and 41B are sectional views respectively showing third and fourth modifications of the trough.

FIGS. 41A and 41B respectively show modifications for realizing smooth movement of first and second rotors 349 and 353. In the modification shown in FIG. 41A, plate 364 of, e.g., a resin having a low sliding fictional resistance is adhered to or fixed by screws to at least a portion of the surface of trough 300, in order to reduce a frictional force generated when second or first rotor 353 or 349 is moved.

In the modification shown in FIG. 41B, Teflon coating 365 or the like is applied on at least a portion of the surface of trough 300 so as to reduce a sliding frictional resistance in the same manner as in the modification shown in FIG. 41A. As still another modification for reducing a frictional resistance, first or second rotor 349 or 353 itself may be formed of a material (e.g., Teflon) having a low frictional resistance.

FIGS. 42A and 42B show modifications wherein a plurality of ball bearings 366 are assembled in at least one of second and first rotors 353 and 349 in order to reduce frictional force generated when first or second rotor 349 or 353 is moved. When bearings 366 are assembled in rotor 349 or 353, sliding friction can be converted to rolling friction, and hence, frictional force can be further decreased.

FIGS. 43A to 43C show a modification of support arm 356 of substrate holding mechanism 54. More specifically, in this modification, support arm 356 is bent twice or more in different directions so that substrate 48 can be inserted in the water surface prior to second rotor 353 and support are 356 while substrate 48 is inclined at any angle to the water surface.

More specifically, support arm 356 comprises horizontal portion 353 coaxially and horizontally extending from second rotor 353, vertical portion 353b extending from the extended end of the horizontal portion to be perpendicular thereto, and second horizontal portion 353c extending from the extended end of the vertical portion in a direction perpendicular to the vertical and horizontal portions. Holder 354 is fixed to the extended end of the second horizontal portion. With this arrangement, as is shown in FIG. 43C, if substrate 48 crosses the water surface while being inclined at any angle, it can cross the water surface prior to support arm 356 and rotor 353.

When substrate 48 can be inserted in the water surface while being inclined at any angle, as described above, a hetero film can be built up by changing the angle of substrate 48 so as to eliminate the influence of a surface tension due to a difference in viscosity of monomolecules or difference in type of liquid. Further, when lift mechanism 56, horizontal moving mechanism 58, and rotating mechanism 55 are simultaneously or independently driven, a high-quality hetero film can be formed.

In the fifth embodiment, one trough 300 is divided into a plurality of water surface sections, e.g., five water surface sections 301a to 301e, as is shown in FIG. 33, using the partition plates. Alternatively, a plurality of independent troughs may be used. When independent troughs are used, mixture and deterioration of different developed monomolecules can be prevented.

In order to develop different monomolecules, it is important to use water having an aqueous phase suitable for the molecules to be developed. When independent troughs are used, the aqueous phase composition of each trough can be set to have an arbitrary pH, temperature, and ion concentration. For this reason, a selection range of molecules to be developed can be widened. By combining the processes, X, Y, and Z-type film structures can be very easily obtained.

Figure 44:
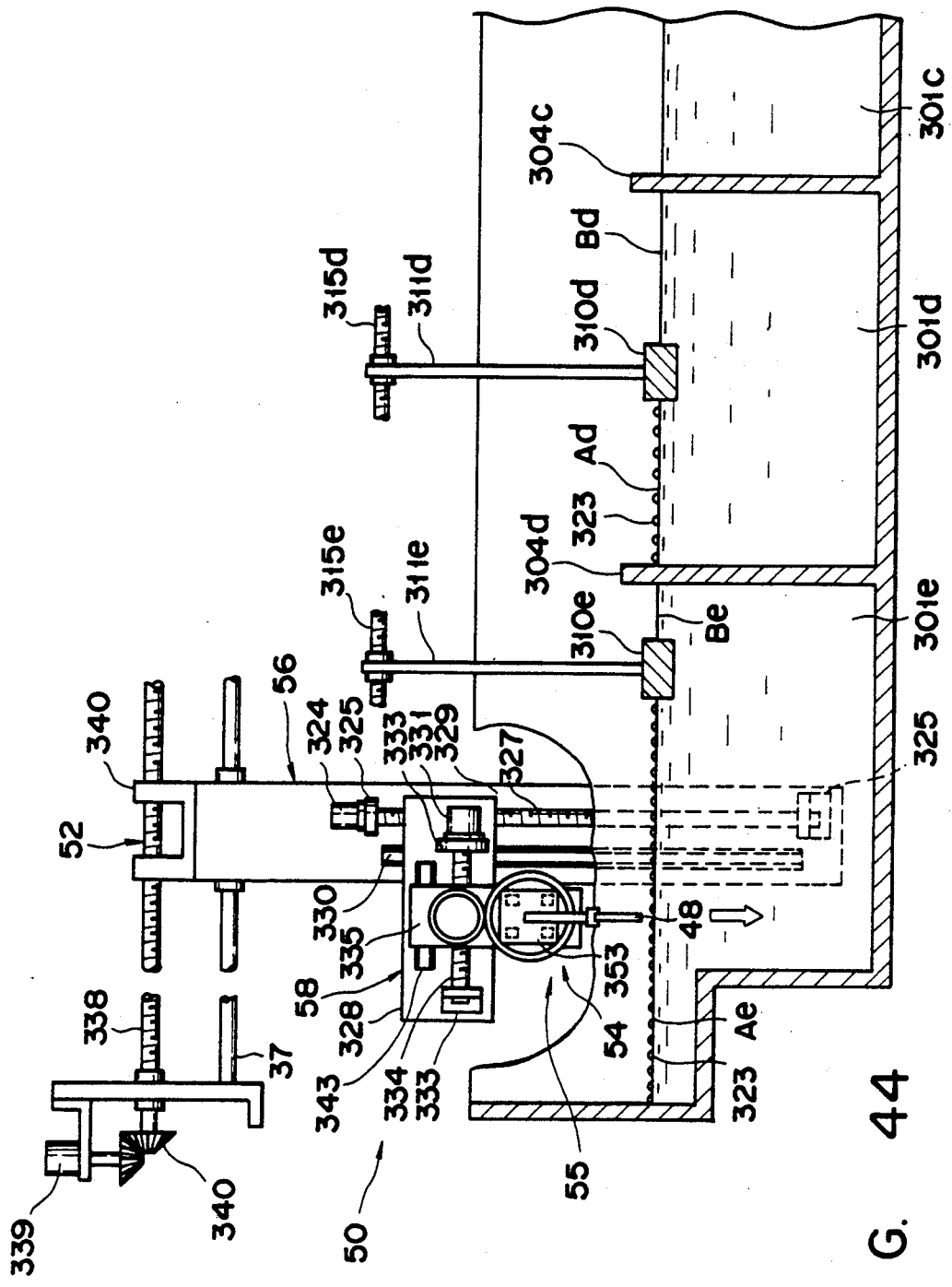
FIG. 44 is a partially cutaway side view showing a forming apparatus according to a sixth embodiment of the present invention.

When independent troughs are to be used, partition plates 305a to 305d in the fifth embodiment extend to the bottom of trough 300 to form partition walls 304a to 304e, as is shown in FIG. 44. The height of each of partition walls 304a to 304d is set to be lower than that of the common side wall of troughs 301a to 301e. First and second rotors 349 and 353 are arranged to be movable between troughs 301a to 301e along the common side wall, so that substrate 48 can be moved or rotated in the same manner as in the fifth embodiment.

In the fifth embodiment, the detailed arrangements of substrate drive device 50 and transporting device 52 for vertically and horizontally moving, rotating, and transporting the substrate can be modified as needed. Horizontal moving mechanism 58 and device 52 may be constituted as one unit if they move substrate 48 in the same direction.

What is claimed is:

1. An apparatus for forming an organic film on a surface of a work, comprising:

developing means for storing a liquid and defining a developing region on a liquid surface of the liquid on which organic molecules can be developed; and work drive means for moving said work in a desired direction through the developing region causing a monomolecular film developed on the developing region to attach on the surface of said work, said work drive means including holding means, having a holding portion engaged with said work, for holding said work so that said work passes entirely through the developing region on which the monomolecular film is developed, while said work drive means is away from the developing region.

2. An apparatus according to claim 1, wherein said holding means includes a first holder for holding that portion of said work which is located above the developing region when said work is moved through the developing region on which the monomolecules are developed, and a second holder for holding that portion of said work which is located below the developing region when said work is moved through the developing region on which the monomolecules are developed, said first and second holders constituting said holding portion.

3. An apparatus according to claim 2, wherein said work drive means includes first lift means for moving said first holder upward and downward in a predetermined direction in a region above the liquid surface, and second lift means for moving said second holder upward and downward in said predetermined direction.

4. An apparatus according to claim 3, wherein said holding means comprises a support arm supporting said second holder, said support arm having a vertical portion connected to said second lift means and extending in said predetermined direction, and a horizontal portion substantially horizontally extending from said vertical portion, and said second holder being fixed to said horizontal portion and located below said first holder in opposition thereto.

5. An apparatus according to claim 4, wherein said developing means includes a first developing region on which a monomolecular film is developed, and a second developing region which is located adjacent to said first developing region and formed to allow passage of said support arm and second holder, and on which no monomolecules are developed, and said work drive means includes a support member supporting said first and second lift means, and a horizontal moving mechanism for moving said support member in a direction parallel to the liquid surface while said support arm and second holder are dipped in the liquid through said second developing region, so that said first and second holders are moved to positions above and below said first developing region, respectively.

6. An apparatus according to claim 5, wherein said developing means includes a plurality of independent troughs, each trough storing the liquid and having said first and second developing regions partitioned from each other, and which further comprises means for transporting said work drive means through a region above and between said troughs.

7. An apparatus according to claim 4, wherein said support arm is rotatably supported about said vertical portion, and said holding means includes rotating means for rotating said support arm so as to move said second holder between a position below the developing region on which monomolecules are developed and a position below another developing region defined by the developing means.

8. An apparatus according to claim 7, wherein said support arm has a plurality of horizontal portions radially extending from an extended end of said vertical portion, and said holding means includes a plurality of said second holders fixed to said horizontal portions, respectively.

9. An apparatus according to claim 2, wherein said holding means includes a support member supporting said first and second holders; said first holder has a pair of first holding pawls which are mounted on said support member to be movable between open and closed positions, have distal end portions located outside said support member, and can clamp the work between said distal end portions at the closed position; said second holder has a pair of second holding pawls which are mounted on said support member to be movable between open and closed positions, have distal end portions located outside said first holding pawls and extending beyond said distal end portions of said first holding pawls, and can clamp said work between said distal end portions at the closed position; said holding means including first opening/closing means for opening/closing said first holding pawls, and second opening/closing means for opening/closing said second holding pawls; said work drive means includes lift means for moving said holding means upward and downward with respect to the liquid surface; and said developing means includes a first developing region on which monomolecules are developed, and a second developing region which is defined around said first developing region and on which no monomolecules are developed; said second holding pawls being arranged to pass through said second developing region when said holding means is moved upward and downward.

10. An apparatus according to claim 9, wherein said support member has a first portion supported by said lift means and supporting said second holding pawls, and a second portion supporting said first holding pawls and connected to said first portion to be pivotal in a direction in which said first holding pawls separate from the liquid surface, and said holding means includes pivoting means for pivoting said second portion.

11. An apparatus according to claim 9, wherein said work drive means includes horizontal moving means for horizontally conveying said lift means along the liquid surface.

12. An apparatus according to claim 2, wherein said holding means includes a support member extending in a predetermined direction with respect to the liquid surface and supporting said first and second holders; said first holder has a pair of pins which extend from said support member and have distal end portions, for clamping said work between said distal end portions; said second holder has a pair of pins which are located below said first holder and separated therefrom by a predetermined interval, extend from said support member, and have distal end portions, respectively, for clamping said work between said distal end portions; said developing means includes a first developing region on which monomolecules are developed, and a second developing region which is defined adjacent to said first developing region and on which no monomolecules are developed; said work drive means includes lift means for, while said work is held by said first and/or second holder, moving said support member upward and downward through said second developing region in the predetermined direction so that the held work is moved through said first developing region; and said holding means includes a first opening mechanism for, while said first holder is located above the liquid surface, moving said pins of said first holder to closed positions capable of clamping said work, and for, prior to said first holder crossing the liquid surface and while said first holder is located in the liquid, moving said pins of said first holder to open positions at which said pins can pass through said second developing region, and a second opening mechanism for, while said second holder is located in the liquid, moving said pins of said second holder to closed positions capable of clamping said work, and for, prior to said second holder crossing the liquid surface and while said second holder is located above the liquid surface, moving said pins of said first holder to open positions at which said pins can pass through said second developing region.

13. An apparatus according to claim 12, wherein said support member has a first cylinder; said first holder has a first biasing member, disposed in said first cylinder and coupled to said pins, for biasing said pins to the closed positions; said second holder has a second biasing member, disposed in said first cylinder and coupled to said pins, for biasing said pins to the closed positions; said first opening/closing mechanism comprises a second cylinder coaxially and rotatably inserted in said first cylinder, a first pressing means, fixed to said second cylinder and engaged with said first biasing member, for pressing said first biasing member according to rotation of said second cylinder to move said pins of said first holder to the open positions, and a first rotating mechanism for rotating said second cylinder, said second opening/closing mechanism comprises a rotational shaft coaxially and rotatably inserted in said second cylinder, a second pressing member, fixed to said rotational shaft and engaged with said second biasing member, for pressing said second biasing member according to rotation of said rotational shaft to move said pins of said second holder to the open positions, and a second rotating mechanism for rotating said rotational shaft.

14. An apparatus for forming an organic film on a surface of a work, comprising:
developing means for storing a liquid and defining a developing region on a liquid surface of the liquid on which organic molecules can be developed; and
work drive means for moving said work in a desired direction through the developing region causing a monomolecular film developed on the developing region to attach on the surface of said work, said work drive means including holding means, having a holding portion engaged with said work, for holding said work so that when said work passes through the developing region on which the monomolecular film is developed, said holding portion is away from the developing region or passes through the developing region after almost the entire work passes through the developing region on which the monomolecular film is developed;
said holding means including a first holder for holding that portion of said work which is located above the developing region when said work is moved through the developing region on which the monomolecules are developed, and a second holder for holding that portion of said work which is located below the developing region when said work is moved through the developing region on which the monomolecules are developed, said first and second holders constituting said holding portion, said work drive means including first lift means for moving said first holder upward and downward in a predetermined direction in a region above the liquid surface, and second lift means for moving said second holder upward and downward in said predetermined direction;
said holding means including a support arm supporting said second holder, said support arm having a vertical portion connected to said second lift means and extending in said predetermined direction, and a bent portion extending from the vertical portion and having an extended end provided with said second holder, said bent portion being formed to be deformable between an upright position where said bent portion extends coaxially with said vertical portion and the work held by said second holder extends downward therefrom and a bent position where said second holder is located below said first holder to oppose it and said work extends upward from said second holder, and said holding means including deforming means for deforming said bent portion between the upright and bent positions between said plurality of developing regions.

15. An apparatus according to claim 14, wherein said bent portion has a plurality of joint members rotatably coupled to each other, and said deforming means includes a wire extending from the joint member located at the extended end of said bent portion through the remaining joint members and said vertical member, and means for pushing and pulling said wire.

16. An apparatus according to claim 14, wherein said second holder has a vacuum chuck for sucking said work, and said holding means includes suction means for causing said chuck to generate a suction force.

17. An apparatus for forming an organic film on a surface of a work, comprising:
developing means for storing a liquid and defining a developing region on a liquid surface of the liquid on which organic molecules can be developed; and
work drive means for moving said work in a desired direction through said developing region causing a monomolecular film developed on the developing region to attach on the surface of said work, said work drive means including holding means, having a holding portion engaged with said work, for holding said work so that when said work passes through the developing region on which the monomolecular film is developed, said holding portion is away from the developing region or passes through the developing region after almost the entire work passes through the developing region on which the monomolecular film is developed;
said work drive means including work rotating means for rotating said holding means so that when said work is moved from a position above the liquid surface into the liquid through the developing region on which monomolecules are developed, said work extends downward from said holding portion, and when said work is pulled up from the liquid to a position above the liquid surface through the developing region on which monomolecules are developed, said work extends upward from said holding portion;
said developing means including a trough storing the liquid therein and having at least one side wall, said work rotating means including a first moving member arranged outside said side wall to be rotatable and movable along the outer surface of said side wall, and rotational drive means for rotating said first moving member, said holding means including a second moving member which is arranged inside said side wall to be rotatable and movable along the inner surface of said side wall, following to the movement of said first moving member, and said work drive means including lift means for moving said first moving member along the outer surface of said side wall in the predetermined direction.

18. An apparatus according to claim 17, wherein said work drive means comprises coupling means for coupling said first and second moving members by magnetic force while interposing said side wall therebetween so that said second moving member is rotated and moved following said first moving member.

19. An apparatus according to claim 18, wherein said coupling means comprises a magnet arranged in one of said first and second moving members, and an attraction member which is arranged in the other one of said first and second moving members and attracted by said magnet.

20. An apparatus according to claim 19, wherein said attraction member is formed of a magnet.

21. An apparatus according to claim 19, wherein said attraction member is formed of a magnetic material.

22. An apparatus according to claim 19, wherein said side wall is formed to be thinner than the remaining portion of said trough.

23. An apparatus according to claim 19, wherein said side wall is formed of a non-magnetic material.

24. An apparatus according to claim 19, wherein said trough comprises a sheet formed on at least one of the outer and inner surfaces of said side wall and formed of a material having a frictional coefficient smaller that of said side wall so as to reduce friction between said moving members and said side wall.

25. An apparatus according to claim 19, wherein at least one of said first and second moving members has a bearing which is in contact with a surface of said side wall so as to reduce friction between said moving member and said side wall.

26. An apparatus according to claim 17, wherein said trough has opposite first and second side walls and storing the liquid therein; said first moving member comprises a first drive-side moving element which is arranged outside said first side wall to be rotatable and movable along the outer surface of said first side wall, and a second drive-side moving element which is arranged outside said second side wall to be rotatable and movable along the outer surface of said second side wall, and said rotational drive means synchronously rotates said first and second drive-side moving elements; said second moving member comprises a first driven-side moving element which is arranged inside said first side wall to be rotatable and movable along an inner surface of said first side wall, following to the movement of said first drive-side moving element, a second driven-side moving element which is arranged inside said second side wall to be rotatable and movable along an inner surface of said second side wall, following the movement of said second drive-side moving element, a coupling member for coupling said first and second driven-side moving elements, and a holder constituting said holding portion and attached to said coupling member; and said work drive means comprises lift means for moving said first and second drive-side moving elements upward and downward in the predetermined direction.

27. An apparatus according to claim 26, wherein said work drive means comprises first coupling means for coupling said first drive-side and driven-side moving elements by magnetic force while interposing said first side wall therebetween so that said first driven-side moving element is rotated and moved following said first drive-side moving element, and second coupling means for coupling said second drive-side and driven-side moving elements by magnetic force while interposing said second side wall therebetween so that said second driven-side moving element is rotated and moved following said second drive-side moving element.

28. An apparatus according to claim 17, wherein said holding means comprises a support arm fixed to said second moving member, said support arm having a first portion extending from said second moving member to be substantially parallel to the liquid surface, and a second portion extending from the extended end of said first portion to be substantially perpendicular to said first portion, and having an extended end located outside an edge of said second moving member, and said holder being fixed to the extended end of said second portion.

29. An apparatus according to claim 28, wherein said support arm has a third portion extending from the extended end of said second portion to be substantially perpendicular to said first and second portions, and said holder is fixed to the extended end of said third portion.

30. An apparatus according to claim 17, wherein said developing means comprises a plurality of partition members for partitioning the liquid surface in said trough into a plurality of developing regions which are aligned along said side wall and on which monomolecules can be developed.

31. An apparatus according to claim 30, wherein said developing means comprises a plurality of compression means each for partitioning a corresponding one of said developing regions into a first developing region on which monomolecules are developed and a second developing region on which no monomolecules are developed, and for compressing the developed monomolecules to a predetermined surface pressure.

32. An apparatus according to claim 30, wherein said work drive means comprises horizontal moving means for moving said first moving member in a direction substantially parallel to the liquid surface.

33. An apparatus according to claim 17, wherein said trough comprises a plurality of partition walls for partitioning the interior of said trough into a plurality of independent water sections which are aligned along said side wall and store the liquid therein, respectively, the liquid surface of the liquid stored in each of said water sections defines a developing region on which monomolecules can be developed, and said side wall extends upward beyond an upper edge of each of said partition walls so as to allow said second moving member to move above said partition walls.

34. An apparatus according to claim 33, wherein said developing means comprises a plurality of compression means each for partitioning a corresponding one of said developing regions into a first developing region on which monomolecules are developed and a second developing region on which no monomolecules are developed, and for compressing the developed monomolecules to a predetermined surface pressure.

35. An apparatus according to claim 33, wherein said work drive means comprises horizontal moving means for moving said first moving member in a direction substantially parallel to the liquid surface.

36. An apparatus for forming an organic film on a surface of a work, comprising:

developing means for storing a liquid and defining a developing region on a liquid surface of the liquid on which organic molecules can be developed; and work drive means for moving said work in a desired direction through the developing region causing a monomolecular film developed on the developing region to attach on the surface of said work, said work drive means including first holding means for holding the work in a region located above said liquid surface, and a second holding means for holding the work in a region below the liquid surface so that said work is transferred between the first and second holding means, wherein said work drive means includes first lift means arranged above the liquid surface, for moving said work upward and downward with respect to and only above the liquid surface and constituting said first holding means, and second lift means arranged in the liquid in opposition to said first lift means, for moving said work upward and downward with respect to and only below the liquid surface so as to transfer the work between said first and second lift means, and constituting said second holding means.

37. An apparatus according to claim 36, wherein said work drive means includes a first rotating mechanism for rotating said first lift means so that the surface of said work is inclined at a predetermined angle to the liquid surface; and a second rotating mechanism for rotating said second lift means so that the surface of said work is inclined at said predetermined angle to the liquid surface.

38. An apparatus according to claim 36, wherein said first lift means includes a pair of parallel first endless belts capable of clamping an end portion of said work therebetween, said first belt drive means for synchronously driving said endless belts to move the clamped work upward and downward, and said second lift means includes a pair of parallel second endless belts capable of clamping an end portion of said work therebetween, and second belt drive means for synchronously driving said second endless belts to move the clamped work upward and downward, said second and first endless belts being arranged along an identical line.

39. An apparatus according to claim 36, wherein said work drive means includes first horizontal moving means for moving said first lift means above and along the liquid surface, and second horizontal moving means for moving said second lift means in the liquid along the liquid surface.

* * * * *